US012147682B1

(12) United States Patent
Subramanian et al.

(10) Patent No.: US 12,147,682 B1
(45) Date of Patent: Nov. 19, 2024

(54) TECHNIQUES FOR PRIORITIZING REPLICATED WRITES FROM MULTIPLE SOURCES ON A DISASTER RECOVERY SITE

(71) Applicant: Dell Products L.P., Hopkinton, MA (US)

(72) Inventors: Vasudevan Subramanian, Chapel Hill, NC (US); Girish Sheelvant, Hopkinton, MA (US); Nagapraveen Veeravenkata Seela, Cary, NC (US); Socheavy D. Heng, Framingham, MA (US)

(73) Assignee: Dell Products L.P., Hopkinton, MA (US)

( * ) Notice: Subject to any disclaimer, the term of this patent is extended or adjusted under 35 U.S.C. 154(b) by 27 days.

(21) Appl. No.: 18/140,154

(22) Filed: Apr. 27, 2023

(51) Int. Cl.
    *G06F 3/06* (2006.01)

(52) U.S. Cl.
    CPC .......... *G06F 3/0619* (2013.01); *G06F 3/0631* (2013.01); *G06F 3/065* (2013.01); *G06F 3/0659* (2013.01); *G06F 3/067* (2013.01)

(58) Field of Classification Search
    CPC ........................................................ G06F 3/06
    See application file for complete search history.

(56) References Cited

U.S. PATENT DOCUMENTS 8,230,202 B2 *   7/2012   Berg ................... G06F 11/3636
                                                        712/227
2018/0314666 A1 * 11/2018   Tanaka ................ G06F 13/1668

* cited by examiner

Primary Examiner — Khoa D Doan
(74) Attorney, Agent, or Firm — Muirhead and Saturnelli, LLC

(57) ABSTRACT

Techniques can include: configuring source sites in a replication configuration with a target site; receiving, at a first of the source sites from a host, a write I/O to a target location of a source storage object of the source site; sending a replicated write corresponding to the write I/O from the first source site to the target site, wherein the replicated write writes to the target location of a target storage object of the target site; prioritizing the replicated write, based at least in part, on a site-level priority associated with the first source site; placing the first replicated write in a first queue of a first plurality of queues based, at least in part, on the site level priority associated with the first source site; selecting the first replicated write from said first queue; and servicing the first replicated write.

19 Claims, 9 Drawing Sheets

TECHNIQUES FOR PRIORITIZING REPLICATED WRITES FROM MULTIPLE SOURCES ON A DISASTER RECOVERY SITE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: configuring a plurality of source sites in a replication configuration with a single target site, wherein each of the plurality of source sites includes a source storage object configured for replication to a corresponding target storage object of the single target site, wherein the replication configuration provides for automatically replicating writes, that are directed to source storage objects of the source sites, to corresponding target storage objects of the single target site; receiving, at a first of the plurality of source sites from a host, a first write I/O that writes first content to a first target location of a first source storage object of the first source site; applying the first write I/O to the first target location of the first source storage object of the first source site; sending a first replicated write corresponding to the first write I/O from the first source site to the single target site, wherein the first replicated write writes the first content to the first target location of a first target storage object of the single target site; prioritizing the first replicated write, based at least in part, on a site-level priority associated with the first source site; placing the first replicated write in a first queue of a first plurality of queues based, at least in part, on the site level priority associated with the first source site; selecting the first replicated write from said first queue; and servicing the first replicated write.

In at least one embodiment, prioritizing the first replicated write can further include prioritizing the first replicated write based, at least in part, on a first storage resource level priority specified for the first target storage object of the single target site. The single target site can include a plurality of sets of priority queues, wherein each set of the plurality of sets of priority queues can include two or more priority queues for replicated writes and where said each set can be associated with a corresponding one of the plurality of source sites, wherein said first plurality of queues can be included in a first set of the plurality of sets and where the first set can be associated with the first source site. The first plurality of queues can include a single queue for each predefined storage resource level priority included in a plurality of predefined storage resource priority levels.

In at least one embodiment, processing can include receiving a first table of percentages denoting apportionments of tokens between front-end (FE) I/O processing at the single target site and background operation I/O processing at the single target site, wherein the background operation I/O processing includes processing of replicated writes received from the plurality of source sites. Processing can include receiving a second table of percentages denoting apportionments of tokens among the plurality of source sites. Processing can include receiving a third table of percentages denoting apportionments of tokens among the plurality of sets of priority queues of replicated writes from the plurality of source sites. The third table can include a plurality of storage resource level percentages for each of the plurality of source sites. The third table can further include an additional set of percentages denoting apportionments of tokens among first FE I/O priority queues of external I/Os received at the single target set from one or more hosts. The external I/Os can be received at the single target site and can be directed to one or more production storage objects exposed over one or more active paths from the single target site to the one or more hosts.

In at least one embodiment, processing can include apportioning a number of tokens T between the FE I/O processing of the single target site and the background I/O processing at the single target site in accordance with the first table of percentages, wherein said apportioning the number of tokens T results in allocating T1 of the T tokens to FE I/O processing and T2 of the T tokens to background I/O processing. Processing can include: apportioning the T1 tokens allocated to FE I/O processing among the first FE I/O priority queues in accordance with the additional set of percentages; apportioning the T2 tokens allocated to background I/O processing among the plurality of source sites in accordance with the second table of percentages, wherein each of the plurality of source sites is allocated a corresponding one of a plurality of source site portions of the T2 tokens of background I/O processing; and apportioning each of the plurality of source site portions of the T2 tokens among a corresponding one of the plurality of sets of priority queues of replicated writes associated with said each source site in accordance with the plurality of storage resource level percentages for said each source site.

In at least one embodiment, processing can include: receiving a request from the first source site to increase the site level priority of the first source site, wherein the first source site has a first site level priority prior to receiving the request; and responsive to receiving the request, increasing the site level priority of the first source site from the first site level priority to a second site level priority that denotes a higher level priority and level of service than the first site level priority. The second table can include a first source site level percentage denoting an apportionment of tokens for the first source site, and wherein increasing the site level priority of the first source site can include increasing the first source site level percentage and accordingly decreasing at least one other source site level percentage of the second table. The request can include a specified time period and wherein the increase in site level priority of the first source site from the first site level priority to the second site level priority can be effective for the specified time period. Subsequent to the specified time period expiring or completing, the site level priority of the first source site can be restored to the first site level priority. The request can be sent by the first source site responsive to the first source site receiving an RPO (recovery point objective) alert indicating non-compliance with a specified target RPO for at least one source storage object of the first source site configured for replication to at least one corresponding target storage object of the single target site.

In at least one embodiment, the first plurality of queues can include replicated writes received from only the first source site, wherein each queue of the first plurality of queues can be associated with a corresponding one of a plurality of predefined storage resource level priorities, and wherein the first source storage object can have an associated first attribute identifying a first of the predefined storage resource level priorities assigned to the first source storage object. Processing can include selecting to place the first replicated write in the first queue based, at least in part, on the first attribute of the first source storage object identifying the first predefined storage resource level priority. The first queue can include replicated writes which are sent from the first source site to the single target site and which are directed to target storage objects of the single target site assigned the first predefined storage resource level priority.

In at least one embodiment, the first plurality of queues for replicated writes of the first source site can be associated with a first plurality of token pools, where each of the first plurality of queues can be associated with a corresponding one of the first plurality of token pools, and wherein each of the first plurality of token pools can include a number of tokens determined in accordance with the site level priority of the first source site and in accordance with one of the plurality of predefined storage resource level priorities corresponding to said each token pool. The first replicated write can have a first cost expressed as a first number of tokens, wherein the first queue can be associated with a first of the plurality of token pools having a first amount of tokens, and wherein said servicing the first replicated write can include deducting the first number of tokens from the first amount of tokens of the first token pool.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
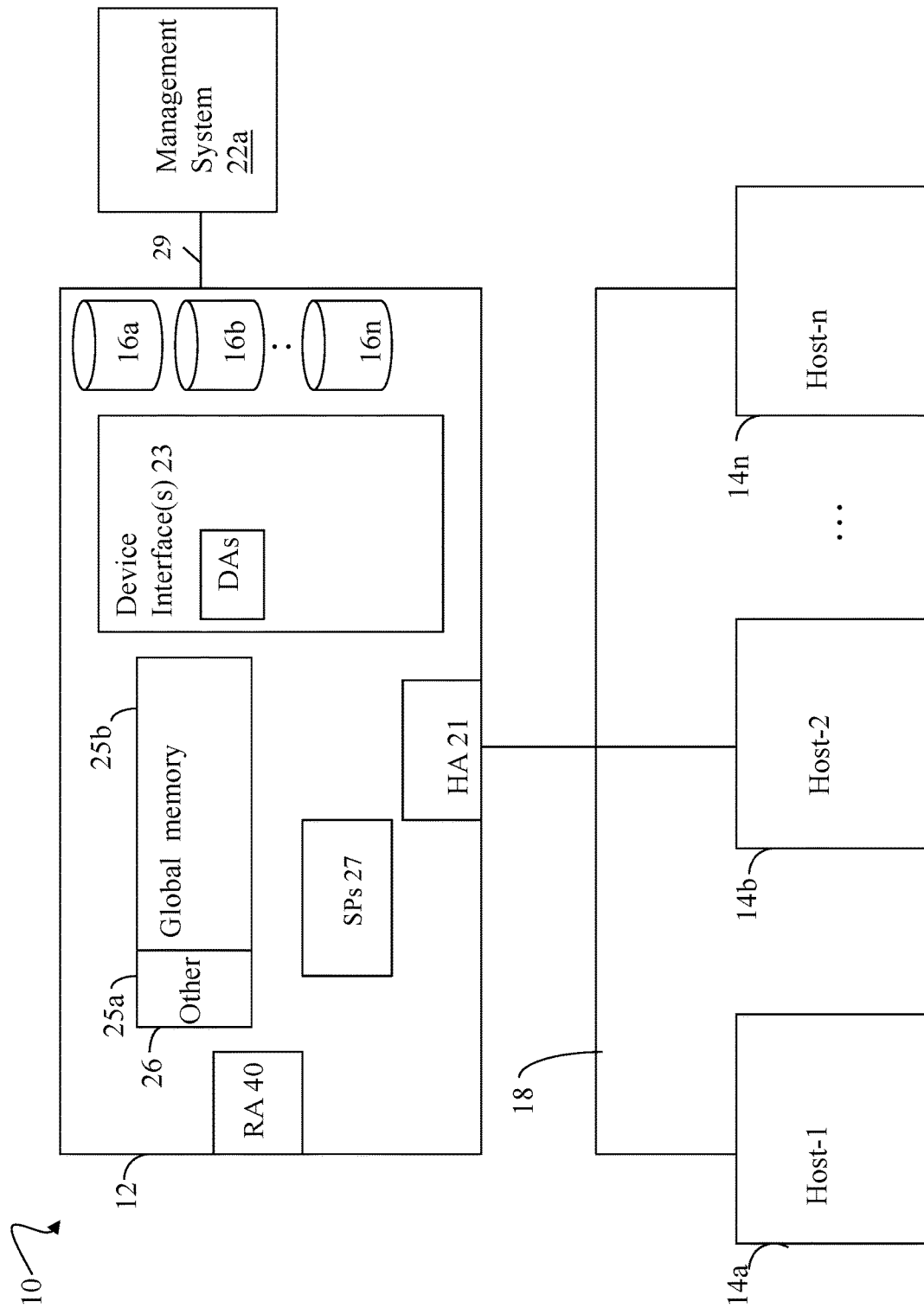
FIG. 1 is an example of components that can be included in a system in accordance with the techniques of the present disclosure.

In at least one existing replication configuration, multiple source systems or sites can be configured to asynchronously replicate content to a single disaster recovery (DR) site or target site. The multiple source sites can be configured to asynchronously replicate writes, which are directed to multiple production or source volumes of the source sites, to multiple target or destination volumes, where the multiple target or destination volumes can be included in the single DR site. Each source or production volume can be included in one of the multiple source systems. Writes to the source volume can be asynchronously replicated to a corresponding target or destination volume of the single DR site, where the corresponding target or destination volume is a replica of the corresponding source volume. Since the writes of the source volumes are asynchronously replicated from the source sites to their corresponding replicas on the DR site, the replicas are not exact point in time mirrors of the source volumes. Rather, due to the asynchronous replication there can be some expected time lag and associated data differences between a source volume of a source site and its corresponding replica or target volume of the DR site. Generally, the foregoing asynchronous replication configuration can have 16 or more source sites replicating writes for thousands of volumes to the single DR site. Each source site can be configured to replicate writes for generally multiple source volumes to corresponding targets or replicas of the DR site.

As a result of the foregoing replication configuration, the single DR site may need to prioritize the replicated writes received from the multiple source sites for the multiple source volumes. In at least one arrangement, the single DR site can be able to prioritize the various replicated writes to the replicas based on the particular target volume or replica. However, such a per volume-level of prioritization of replicated writes can be insufficient and inadequate. It can be desirable to prioritize replicated writes received at the DR site from the multiple source sites based on one or more other criteria such as based the particular source site which sent the replicated writes.

Described in the following paragraphs are techniques of the present disclosure which prioritize replicated writes received at the DR site from the multiple source sites based, at least in part, on the particular source site which sent the replicated writes.

In at least one embodiment, the techniques of the present disclosure provide for per source site prioritization of replicated writes in combination with one or more other types of prioritization. For example, in at least one embodiment, replicated writes received at the DR site can be prioritized based on the particular source site which sent the replicated writes in combination with a per volume level of prioritization. In at least one embodiment, the prioritization based on source site can be a relative priority of each source site with respect to remaining others of the source sites. The prioritization of the source sites can be based, at least in part, on one or more of: a differentiated service level or class of service (e.g., disaster recovery service level), and a current workload of replicated writes from the various source sites.

In at least one embodiment, the DR site can allow for differentiation in levels of services. In one such embodiment, the DR site can be owned by a service provider which can offer, to its customers, different levels of services. Each level of service can have an associated cost and a different associated level of prioritization with respect to servicing replicated writes received from different source sites. For example, a first source site can be owned by a first customer which pays the service provider for providing a first level of service for the first customer at the DR site; and a second source site can be owned by a different second customer which pays the service provider for providing a second level of service for the second customer at the DR site. The first level of service can be a higher level of priority and higher level of service than the second level of service, where the first level of service can have a higher customer cost than the second level of service. For example, the first level of service of the first customer can include the DR site allocating more resources for processing replicated writes of the first customer (and first source site) relative to those resources allocated to processing replicated writes of the second customer (and second source site) with the second lower level of service. As a result, replicated writes received at the single DR site from the first source site can generally be given a higher priority than replicated writes received at the single DR site from the second source site. In this manner, the DR site can, for example, process or service replicated writes from the first source site using more system resources than allocated for use with processing or servicing replicated writes from the second source site. The first higher level of service and higher relative priority as compared to the second level of service can result, for example, in maintaining and achieving a lower and thus better recovery point objective (RPO) for the first customer and first source site as compared to an RPO achieved for the second customer and second source site. An RPO can be defined as the maximum acceptable amount of data loss after an unplanned data-loss incident, expressed as an amount of time. As a result of higher priority assigned to replicated writes of first source volumes of the first source site, the first source volumes' corresponding replicas or target volumes of the DR site can achieve a lower and better RPO in comparison to other replicas or target volumes of the DR site corresponding to second source volumes of the second site.

In at least one embodiment, relative priority can be assigned to the multiple source sites based on multiple defined associated service levels. The multiple service levels can be associated with different costs where a relatively higher level of service can be associated with a higher level of cost. Thus, the multiple service levels can denote a relative priority of the multiple service levels where the higher the cost, the higher the level of service and the higher the priority. In at least one embodiment, the highest service level can denote the highest relative priority and highest or greatest amount of resources allocated for processing replicated writes of such source sites having the highest service level.

In at least one embodiment, the relative priorities of the multiple source sites can be based, at least in part, on the workload (and one or more associated characteristics of such workload) such as the workload of the replicated writes from the multiple source sites. In at least one embodiment, the priority of a source site can be based, at least in part, on the criticality or importance of the source site and/or the source volumes having writes replicated to corresponding target volumes on the DR site. For example, a first source site (and its associated first source volumes) can be categorized as more important relative to a second source site (and its associates second source volumes). As a result first replicated writes from the first source site can be given a higher relative priority than second replicated writes from the second source site. In at least one embodiment, the relative higher criticality or importance of the first site can be based, at least in part, on the relative importance of the first source volumes of the first source site and the relative importance of corresponding target volumes on the DR site.

In at least one embodiment, the relative priorities of the multiple source sites can be based, at least in part, on one or more characteristics of the replicated write workloads of the multiple source sites. In at least one embodiment, one or more characteristics can denote a workload level such as, for example, a replicated write rate (e.g., replicated writes/second where each replicated write can be normalized), and/or a replication data transfer rate or bandwidth (e.g., amount of data received or transmitted per unit of time). For example, a first source site can have a relatively higher or heavier replicated write workload to the DR site than a second source site, where the first source site can be given a higher priority service level than the second source site. In at least one embodiment, the foregoing higher priority service level given to the first source site can be temporary to accommodate a higher or heavier workload of the first source site relative to the second source site at a particular point in time. Thus, in some embodiments, the level or priority of service can dynamically change in accordance with the relative workloads of the replicated writes from the various source sites. For example, if the first source site generally has twice the workload of the second source site at a point in time, approximately the amount of resources twice (or some other suitable amount) can be allocated to processing replicated writes received from the first source site as compared to the second source site for some defined time period. The foregoing relative priority can be based, at least in part, on the relative workloads of the different source sites in order to be able to sufficiently process such replicated writes.

In at least one embodiment, the prioritization of replicated writes from the different multiple source sites on a single DR site can be performed by a DR site administrator or other suitable user. In such an embodiment, the DR site administrator or other user can specify priorities for the multiple source sites. In at least one embodiment, a token-based approach can be used where such tokens can represent resources available for use or consumption. In at least one embodiment, the prioritization of the production sites can include specifying percentage apportionments across the multiple source sites where such percentages can denote percentages of tokens assigned or allocated to the multiple source sites. In such an embodiment, the aggregated percentages of the multiple source sites can equal 100% to denote all the token T apportioned across the multiple source sites for a time period.

In at least one embodiment, multiple source sites can be provided with the ability to request an elevated, increased level of service or priority for a specified time period. For example in at least one embodiment using an application programming interface (API), or a protocol message or command, a source site can issue a request to the DR site for such an increased level of service or priority. The source site can make such a request in response to any suitable condition. For example, the source site may need higher priority service for a specified time period indicated in the message or API call. The foregoing can be sent from the source site, for example, in response to an alert that an RPO of one or more source volumes of the source site is not met (e.g., current RPO exceeds target RPO). As another example, the foregoing can be sent from the source site due to a change in its requirements such as a change in a target or goal RPO for one or more of its source volumes. As yet another example, the request sent can be a general request for a higher level of service where the source site is requesting a change to its apportionment and thus may be billed for a higher level of service than is currently associated with the requesting source site.

In at least one embodiment, the DR site can have the ability to vary or modify the priorities of its replica volumes and its production or other source volumes. In at least one embodiment, the DR site can provide both DR storage services and can also serve as a source or production site for one or more volumes or LUNs. Thus, the DR site can 1) receive replicated writes from multiple source sites and 2) additionally service I/Os for other source volumes received from one or more external hosts where such other source volumes can be directly exposed to the external hosts for I/Os over one or more paths from the DR site. The I/Os for other source volumes exposed to the external hosts for I/Os over one or more paths from the DR site can be referred to as front-end (FE) I/Os received by FE storage system ports of the DR site also functioning as a production or source site. In such an embodiment, the DR site can have the ability to vary the priority of FE I/Os and the priority of replicated writes. In such an embodiment, the DR site can generally give FE I/Os higher priority than replicated writes; and can generally give replicated writes higher priority than replicated writes.

In at least one embodiment, priorities can be assigned to or specified for the multiple source sites, FE I/Os, replicated writes, and volumes in any suitable manner based on any suitable conditions or criteria.

In at least one embodiment, the replication configuration between the multiple source sites and the single DR site can be utilized for asynchronous replication. More generally, the techniques of the present disclosure can be used in connection with any suitable replication mode.

In at least one embodiment, a token-based approach can be used to denote resource allocation and apportionment based on specified priorities. More generally, other suitable approaches for prioritization and/or resource allocation can be utilized in connection with the techniques of the present disclosure.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
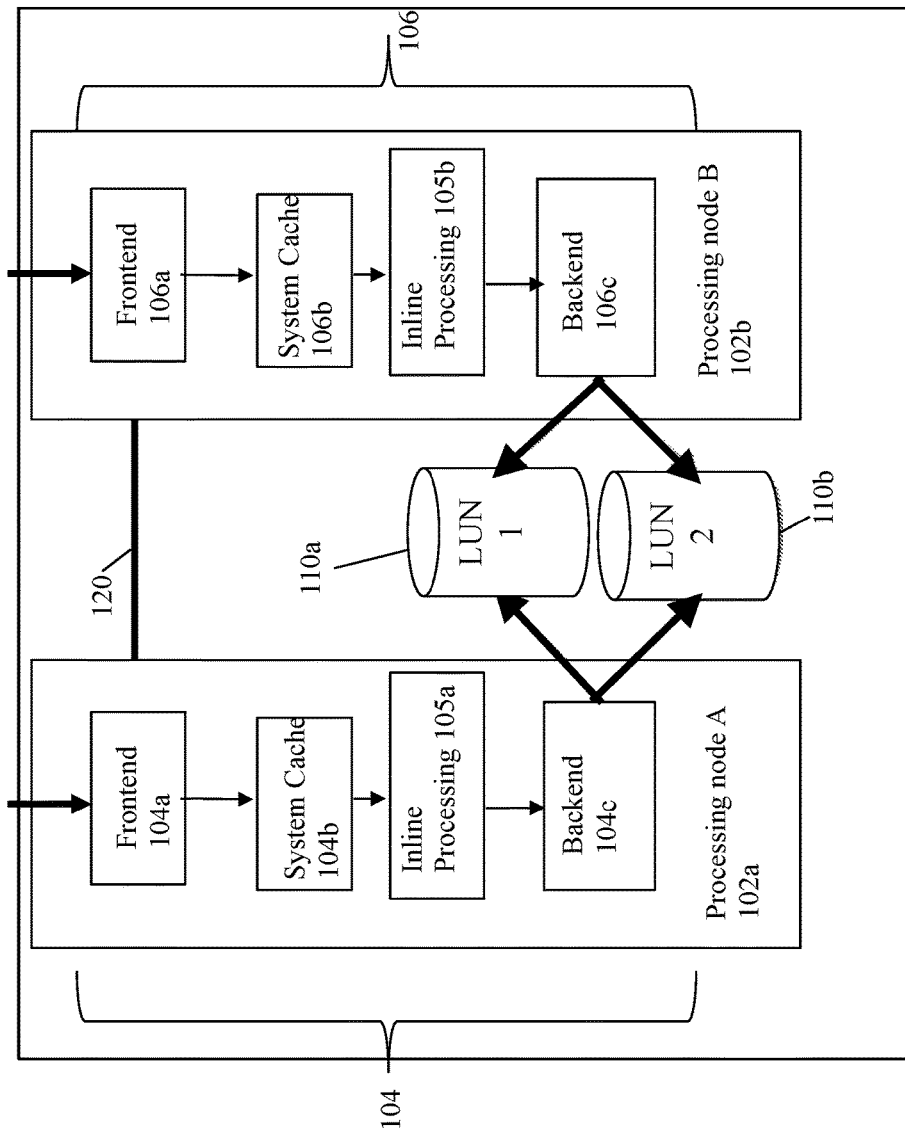
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105$a$, 105$b$ as noted above, data can be loaded from the main memory and/or other lower cache levels into its CPU cache.

In at least one embodiment, the data storage system can be configured to include one or more pairs of nodes, where each pair of nodes can be described and represented as the nodes 102$a$-$b$ in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102$a$ is the peer node of the node B 102$b$, and the node B 102$b$ is the peer node of the node A 102$a$.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
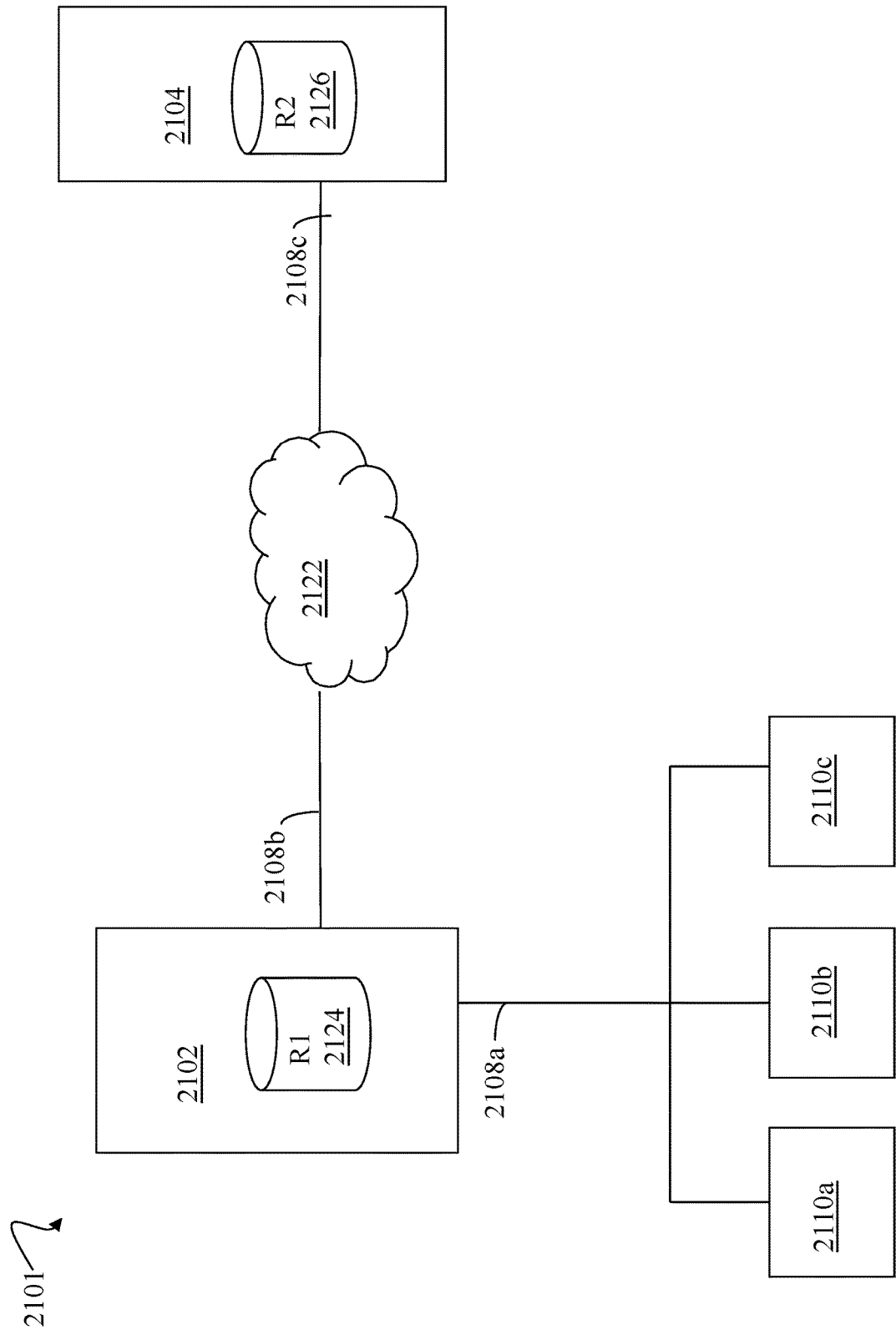
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110$a$, 2110$b$ and 1210$c$. The data storage systems 2102, 2104 can be remotely connected and communicate over the network 2122, such as the Internet or other private network, and facilitate communications with the components connected thereto. The hosts 2110$a$, 2110$b$ and 2110$c$ can issue I/Os and other operations, commands, or requests to the data storage system 2102 over the connection 2108$a$. The hosts 2110$a$, 2110$b$ and 2110$c$ can be connected to the data storage system 2102 through the connection 2108$a$ which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110*a*, 2110*b* and 2110*c*. The data storage system 2104 can be characterized as remote with respect to the hosts 2110*a*, 2110*b* and 2110*c*. The R1 and R2 devices can be configured as LUNs.

The host 2110*a* can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110*a* interacts directly with the device R1 of the data storage system 2102, and any data changes made are automatically provided to the R2 device of the data storage system 2104 by a remote replication facility (RRF). In operation, the host 2110*a* can read and write data using the R1 volume in 2102, and the RRF can handle the automatic copying and updating of data from R1 to R2 in the data storage system 2104. Communications between the storage systems 2102 and 2104 can be made over connections 2108*b*, 2108*c* to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110*a* can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110*a* regarding completion of the write. Thus, the acknowledgement sent from the system 2102 to the host 2110*a* regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108*b*, 2122, and 2108*c*, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
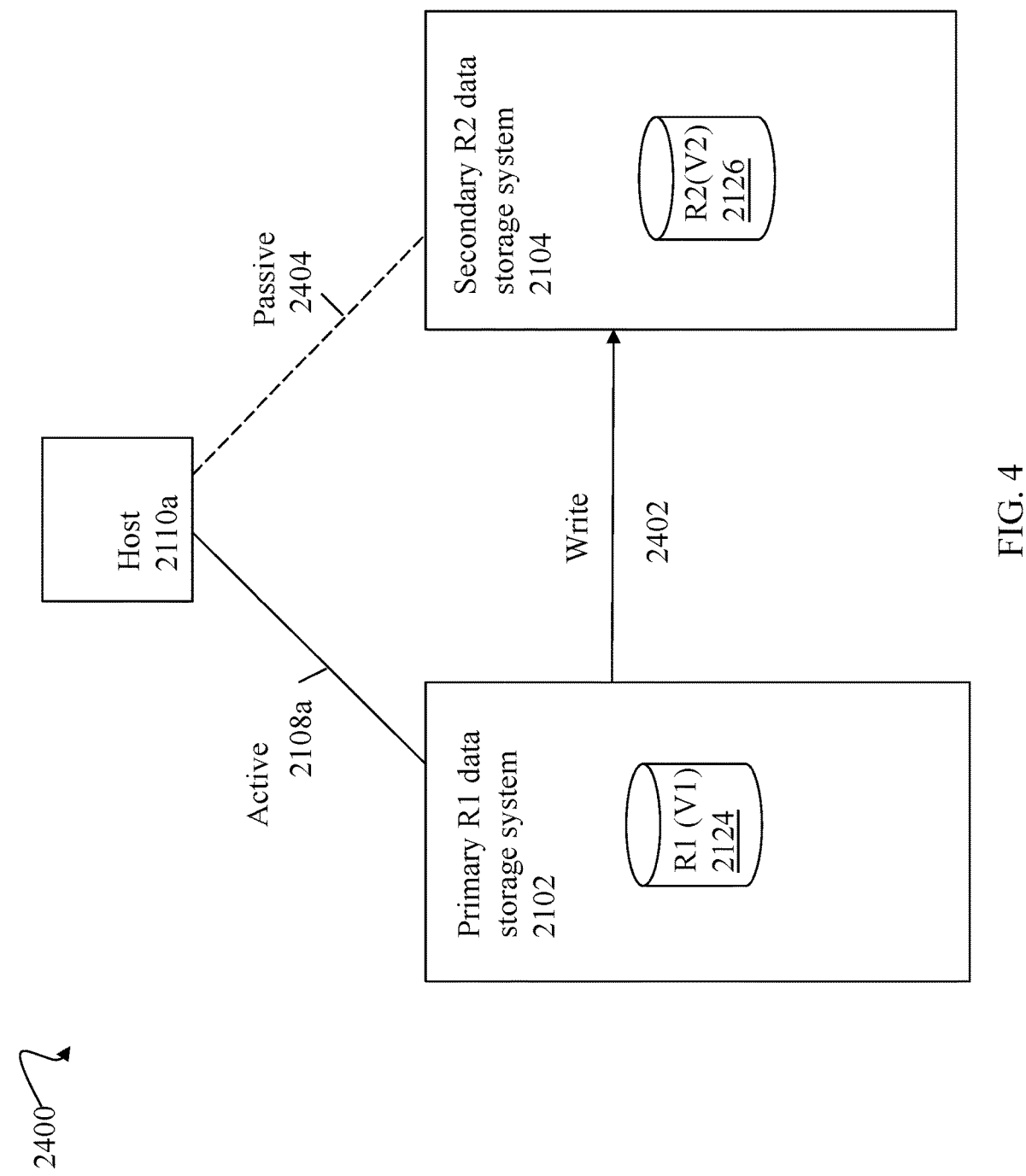
FIGS. 4 and 5 are examples illustrating replication configurations in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110*a* issues a write, or more generally, all I/Os including reads and writes, over a path to only the primary R1 data storage system 2102. The host 2110*a* does not issue I/Os directly to the R2 data storage system 2104. The configuration of FIG. 4 can also be referred to herein as an active-passive configuration with asynchronous replication performed from the R1 data storage system 2102 to the secondary R2 system 2104. With the active-passive configuration of FIG. 4, the host 2110*a* has an active connection or path 2108*a* over which all I/Os are issued to only the R1 data storage system. The host 2110*a* can have a passive connection or path 2404 to the R2 data storage system 2104. Writes issued over path 2108*a* to the R1 system 2102 can be asynchronously replicated to the R2 system 2104.

In at least one embodiment of the configuration of 2400, the R1 device 2124 and R2 device 2126 can be configured and identified as the same LUN, such as LUN A, to the host 2110*a*. Thus, the host 2110*a* can view 2108*a* and 2404 as two paths to the same LUN A, where path 2108*a* is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same worldwide name (WWN) or other identifier as well as having other attributes or properties that are the same. Should the connection 2108*a* and/or the R1 data storage system 2102 experience a failure or disaster whereby access to R1 2124 configured as LUN A is unavailable, processing can be performed on the host 2110*a* to modify the state of path 2404 to active and commence issuing I/Os to the R2 device configured as LUN A. In this manner, the R2 device 2126 configured as LUN A can be used as a backup accessible to the host 2110*a* for servicing I/Os upon failure of the R1 device 2124 configured as LUN A. Alternatively, recovery processing can include copying content from R2 device 2126 of the R2 system 2104 to the R1 device 2124 of the R1 system 2102 to thereby restore R1 2124. Subsequent to restoring R1 2124, the host 2110*a* can resume issuing I/Os to R1 2124 over path 2108*a* where any write I/Os directed to R1 2124 can be replicated and applied in an asynchronous manner to R2 2126 on the storage system 2104.

In at least one embodiment, the pair of devices or volumes including the R1 device 2124 and the R2 device 2126 can be configured as the same single volume or LUN, such as LUN A, to expose the two different devices or volumes (e.g., V1 or R1 2124; V2 or R2 2326), on two different data storage systems 2102, 2104 to the host 2110*a* as the same single volume or LUN. Thus, from the view of the host 2110*a*, the same LUN A is exposed over the two paths 2108*a* and 2404, where R1/V1 and R2/V2 are both configured as the same logical volume or LUN A and where R1/V1 and R2/V2 both have the same identity as presented, viewed or exposed to an external host.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, a file system, a virtual volume or vvol used in connection with virtual machines, and any other suitable storage resource or object.

Generally, the primary or R1 storage system 2102 can also be referred to as a source system or site; the secondary or R2 storage system 2104 can also be referred to as a destination, target or disaster recovery (DR) site; the R1/V1 device 2124 can also be referred to as a production or source volume or LUN having a corresponding R2/V2 device 2126 which can also be referred to as a target, destination or replica volume or LUN.

Figure 5:
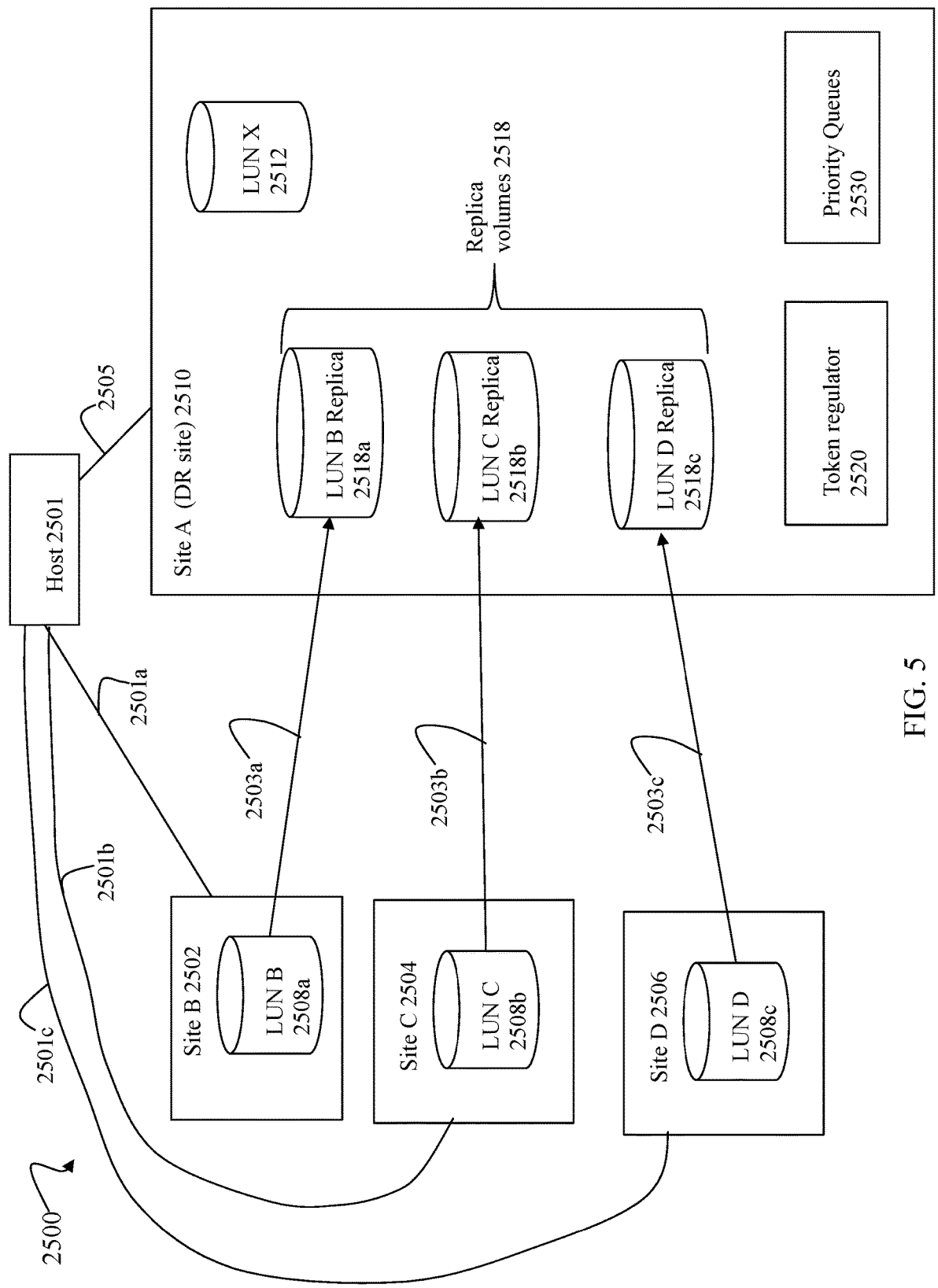

Referring to FIG. 5, shown is an example 2500 illustrating an asynchronous replication configuration in at least one embodiment in accordance with the techniques of the present disclosure.

The example 2500 includes multiple source sites which asynchronously replicate writes to the same single DR site A 2510. In particular, the example 2500 includes source sites B 2502, C 2504 and D 2506.

Site B 2502 includes source LUN B 2508*a* configured for asynchronous replication with LUN B replica 2518*a*, where writes to LUN B 2508*a* are replicated over replication link 2503*a* to DR site A 2510 and applied to LUN B replica 2518*a*. Thus, LUNs or volumes 2508*a* and 2518*a* can be configured for asynchronous replication over link 2503*a* in a manner similar to the asynchronous replication configuration of R1 2124 and R2 2126 of FIG. 4 where replicated writes are transmitted over the replication link 2402 in FIG. 4. In FIG. 5, the host 2501 can issue I/Os to LUN B 2508*a* over active path 2501*a* where such writes are applied to LUN B 2508*a*, replicated to site A 2510 over link 2503*a*, and applied to the corresponding replica LUN B replica 2518*a*.

Site C 2504 includes source LUN C 2508*b* configured for asynchronous replication with LUN C replica 2518*b*, where writes to LUN C 2508*b* are replicated over replication link 2503*b* to DR site A 2510 and applied to LUN C replica 2518*b*. Thus, LUNs or volumes 2508*b* and 2518*b* can be configured for asynchronous replication over link 2503*b* in a manner similar to the asynchronous replication configuration of R1 2124 and R2 2126 of FIG. 4 where replicated writes are transmitted over the replication link 2402 in FIG. 4. In FIG. 5, the host 2501 can issue I/Os to LUN C 2508*b* over active path 2501*b* where such writes are applied to LUN C 2508*b*, replicated to site A 2510 over link 2503*b*, and applied to the corresponding replica LUN C replica 2518*b*.

Site D 2506 includes source LUN D 2508*c* configured for asynchronous replication with LUN D replica 2518*c*, where writes to LUN D 2508*c* are replicated over replication link 2503*c* to DR site A 2510 and applied to LUN D replica 2518*c*. Thus, LUNs or volumes 2508*c* and 2518*c* can be configured for asynchronous replication over link 2503*c* in a manner similar to the asynchronous replication configuration of R1 2124 and R2 2126 of FIG. 4 where replicated writes are transmitted over the replication link 2402 in FIG. 4. In FIG. 5, the host 2501 can issue I/Os to LUN D 2508*c* over active path 2501*c* where such writes are applied to LUN D 2508*c*, replicated to site A 2510 over link 2503*c*, and applied to the corresponding replica LUN D replica 2518*c*.

In at least one embodiment consistent with the above discussion, site A 2510 can be used as a DR site in connection with the asynchronous replication of writes from the multiple source sites 2502, 2504 and 2506. Additionally, in at least one embodiment, site A 2510 can serve as a production site, where site A 2510 can also expose one or more other LUNs or volumes directly to the host 2501 over active path 2505. It should be noted that the path 2505 can be active with respect to the LUN X 2512 where the host 2501 can issue read and/or write I/Os directed to LUN X 2512 over link 2505 and where such I/Os are serviced by site A 2510. However, the path 2505 can be configured as passive with respect to the replica LUNs or volumes 2518*a-c* of site A 2510, where such LUNs or volumes 2518 can be visible to the host 2501 but where the host 2501 cannot directly issue I/Os to the LUNs or volume 2518 of site A over the passive path 2505. Thus, the state of the path 2505 can vary and be specified with respect to particular volumes or LUNs exposed over the path 2505 to the particular host 2501.

In at least one embodiment, configuring an asynchronous replication configuration can include configuring a replication policy for the production or source volumes and also the corresponding target or replica volumes. The replication policy can provide a user with an option of selecting a per volume priority level. For example, in at least one embodiment, each source volume can be configured for asynchronous replication where such configuration includes selecting one of three predefined relative priority levels, such as low (lowest or least priority level), medium (middle or medium priority level) and high (highest or maximum priority level). Although 3 volume priority levels are provided for illustration, more generally any suitable number of volume priority levels can be utilized. In such an embodiment, the specified volume priority level can also be applied to the corresponding target or replica volume on the DR site. The specified volume priority level can be a priority level assigned to replicated writes received at the DR site where such replicated writes are directed to one of the target or replica volumes. Thus the per volume level priority can be used to denote a relative volume level priority among multiple volumes.

For example, reference is made to the volume or LUN B 2508a of site B. The LUN B 2508a is a source volume which can be configured on site B to have a medium priority level. For the source LUN B 2508a, the LUN B replica 2518a can denote the corresponding target or replica volume on the DR site A 2510. The volume priority level of medium as specified for source LUN B 2508a can also be applied to its corresponding replica volume, LUN B replica 2518a, on the DR site A 2510. In at least one embodiment, first writes to LUN B 2508a can be received from the host 2501 at site B 2502. Subsequently the first writes are asynchronously replicated from site B 2502 over link 2503a to the DR site A 2510 and applied to the corresponding replica volume, LUN B replica 2518a. Thus, the medium volume priority level can be applied to the replicated first writes directed to LUN B replica 2518a on the DR site A 2510.

As illustrated in FIG. 5, the site A 2510 can include a token regulator 2520 and multiple priority queues 2530 discussed below. In at least one embodiment, the token regulator 2520 can be included as a component in the data path or the I/O path. The multiple priority queues 2530 are further illustrated and discussed in more detail below in connection with FIG. 6.

It should be noted that although the particular embodiment described herein uses a token-based approach and associated apportionments of such tokens to implement various priorities, other embodiments can utilize the techniques of the present disclosure using the various priorities with other resource allocation and prioritization techniques not based on tokens.

Figure 6:
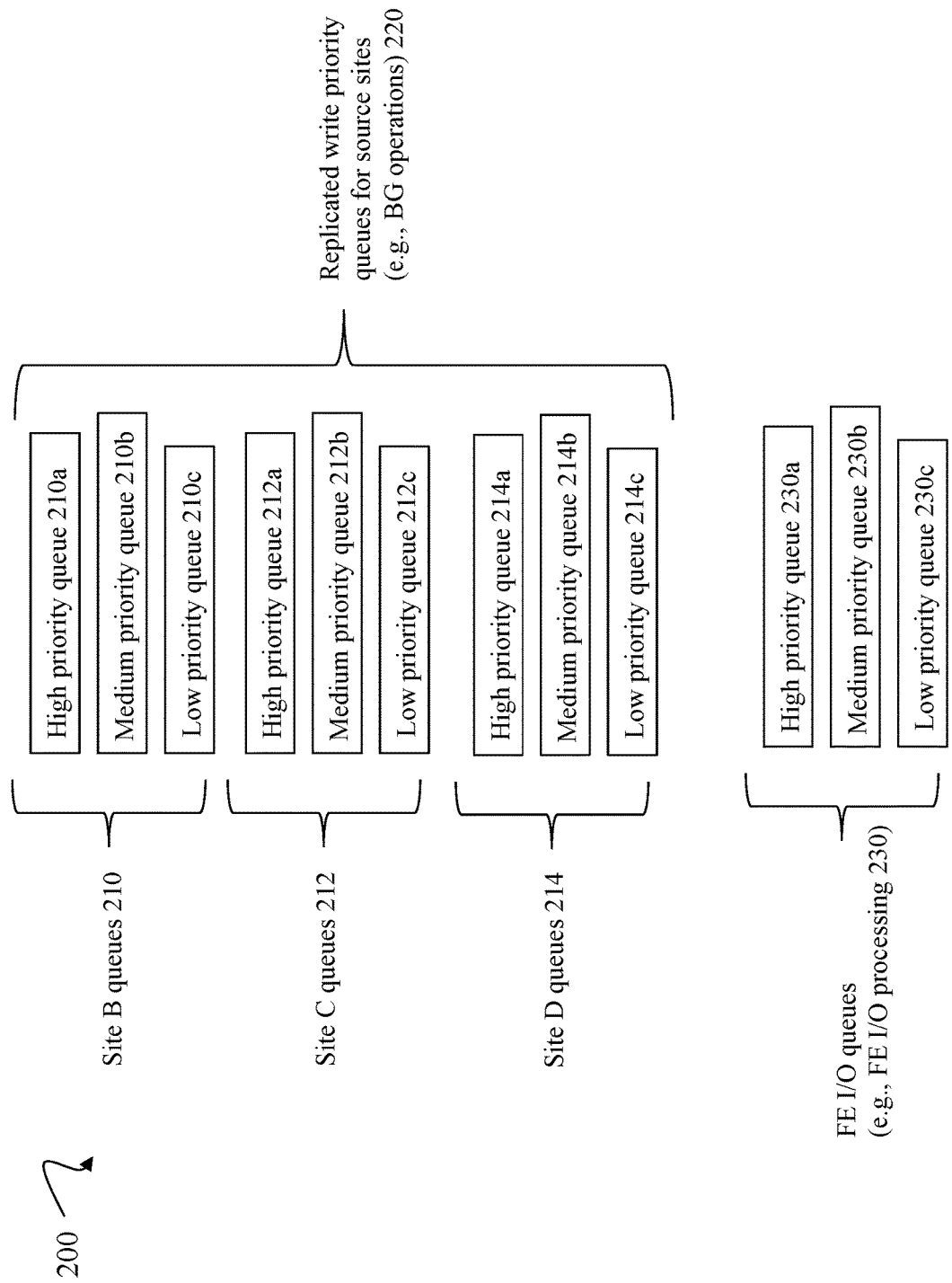
FIG. 6 is an example of priority queues for I/O operations that can be used in at least one embodiment in accordance with the techniques of the present disclosure.

Referring to FIG. 6, shown is an example 200 providing further detail regarding the multiple priority queues 2530 of site A 2510 in at least one embodiment in accordance with the techniques of the present disclosure.

In this example 200, the site A 2510 can include a first set of priority queues, the replicated write priority queues for source sites 200, used in connection with replicated writes received from source sites A 2502, B 2504 ad C 2506. The replicated write priority queues 220 can include: a first subset of site B queues 210 used in connection with replicated writes received from site B 2502; a second subset of site C queues 212 used in connection with replicated writes received from site C 2504; and a third subset of site D queues 214 used in connection with replicated writes received from site D 2506. The site B queues 210 can include a high priority queue 210a, medium priority queue 210b, and low priority queue 210c. The site C queues 212 can include a high priority queue 212a, medium priority queue 212b, and low priority queue 212c. The site D queues 214 can include a high priority queue 214a, medium priority queue 214b, and low priority queue 214c. The site A 2510 can also includes a second set of priority queues, the FE (front end) I/O queues 230, used in connection with FE external I/Os received at FE storage system ports of the site A 2510. The foregoing queues of the example 200 are discussed in more detail below.

In at least one embodiment, a token-based technique can be used in connection with processing I/Os and performing other operations on the DR site A. As shown in FIG. 5, the DR site A can include the token regulator 2520 (sometimes simply referred to as the regulator) which can periodically evaluate and apportion T, denoting a specified total number of tokens, between FE I/O processing and background (BG) operations. Each token can generally denote resources of the site A 2510 available for consumption. A first portion of the T tokens allocated to FE I/O processing is available for consumption and use when servicing FE I/Os on the DR site A; and a second portion of the T tokens allocated to BG operations is available for consumption and use when performing BG operations on the DR site A. In at least one embodiment, servicing or processing replicated writes received on site A 2510 can be included in BG operations. Thus, the queues 220 of FIG. 6 can denote priority queues associated with BG operations; and the queues 230 of FIG. 6 can denote priority queues associated with FE I/O processing. For simplicity of illustration, discussion and examples provided can assume that BG operations include only replicated writes received from source sites 2502, 2504 and 2506. More generally, BG operations can also include other processing and operations.

As discussed elsewhere, each FE I/O operation or replicated write can be assigned a cost and placed on one of the multiple priority queues of FIG. 6 associated with either FE I/O processing 230 or BG operations 220. Each such queue can also have an associated number of tokens available for consumption. As a FE I/O operation or replicated write is selected from one of the queues in the example 200, a number of available tokens of the queue is consumed (and thus decremented from the queue's available tokens) based on the cost of the selected operation. Periodically, the regulator 2520 can evaluate and apportion a new set of T tokens among the various priority queues of the FE I/O processing 230 and BG operations 220 to thereby replenish tokens available for consumption based on the current apportionments. Generally, the regulator can perform the foregoing evaluation and apportionment of a new set of token T based on a predefined time period or cycle, and/or any other specified suitable trigger condition(s).

The FE I/O processing can include I/Os which are received at FE storage ports of the site A 2510, where such I/Os can include external I/Os received from one or more hosts, such as host 2501, or more generally I/O received at the FE storage system ports of site A 2510 from external storage clients. Thus FE I/O processing can denote I/O processing for I/Os received at site A when acting as a production site servicing I/Os. In at least one embodiment as discussed above, site A 2510 can be used as a DR site in connection with the asynchronous replication of writes from sites 2502, 2504 and 2506. Additionally, in at least one embodiment, site A 2510 can also expose one or more other LUNs or volumes, such as LUN X 2512, directly to the host 2501 over active path 2505. The FE I/O processing can denote servicing of such I/Os which are directed to LUN X 2512 and received directly by the site A 2510 from the host 2501 over the path 2505. The BG operations can generally include BG processing operations. In at least one embodiment, BG operations can include processing of replicated writes received at site A functioning as a DR site with respect to replica volumes 2518. Thus, BG operations can include servicing replicated writes received from the sites 2502, 2504 and 2506, where such replicated writes are directed to the replica volumes 2518.

In addition to dividing or partitioning tokens T between the two classifications of FE I/O processing and BG operations (and thus dividing the T tokens between the BG operations queues 220 and FE I/O queues 230), the portions of tokens assigned to each of the foregoing two classifications can be further partitioned. In at least one embodiment, tokens apportioned to FE I/O processing can be further partitioned into multiple different volume level priorities. In at least one embodiment, each volume or LUN exposed to the host 2501 over the path 2505 can be assigned one of a number of predefined volume priority levels. In one such embodiment, there can be 3 predefined volume priority levels as noted above. In this case, the tokens apportioned to FE I/O processing (230) can be further divided into 3 I/O queues 230a-c corresponding to the 3 volume priority levels of high, medium and low. In particular, the higher the volume priority level, the greater the number of FE I/O processing tokens assigned or apportioned each cycle or time period to the particular I/O queue corresponding to the volume priority level. In at least one embodiment, the portion of FE I/O processing tokens assigned or apportioned to each volume priority level can be denoted based on a percentage, where the sum of all percentages across all volume priority levels can be 100%. For example, if there are 1000 tokens apportioned by the token regulator for a time period or cycle to FE I/O processing and thus to the aggregate of FE queues 230, the high priority I/O queue 230a can be assigned 50% or 500 tokens, the medium priority I/O queue 230b can be assigned 30% or 300 tokens and the low priority I/O queue 230c can be assigned 20% or 200 tokens.

In at least one embodiment, tokens apportioned to BG operations and thus in aggregate to the queues of 220, can be first further partitioned among the multiple production or source sites which replicate writes to the DR site A. Subsequently, tokens apportioned to each particular source site can be further partitioned based on volume priority levels. In at least one embodiment, such apportionments can be expressed using percentages such that all percentages at a particular apportionment level total 100%. To illustrate with reference to FIGS. 5 and 6, site B 2502 can be considered a higher priority site than either sites C 2504 or D 2506. For example, site B 2502 can be deemed a critical site or important site much higher in criticality and importance than sites 2504 and 2506. Site B can be, for example, a customer paying for a higher level of service than both sites 2504 and 2506. In this case for a cycle or time period, site B (and thus the aggregate of site B queues 210) can be assigned 50% of all tokens apportioned to BG operations, site C (and thus the aggregate of site C queues 212) can be assigned 25% of all tokens apportioned to BG operations, and site D (and thus the aggregate of site D queues 214) can be assigned 25% of all tokens apportioned to BG operations.

Subsequent to apportioning the BG operations tokens among the source sites as noted above, another level of apportionment of BG operations tokens can be performed for each source site of a configured replication arrangement with site A 2510. For example, assume that there are 1000 tokens apportioned to BG operations and thus 1000 tokens apportioned to the aggregate of the queues 220. Based on the above-noted production or source site percentages, site B and site B queues 210 can be assigned 50% or 500 tokens, site C and site C queues 212 can be assigned 25% or 250 tokens, and site D and site D queues 214 can be assigned 25% or 250 tokens. The BG operations tokens apportioned to each of the foregoing source site-specific queues sets can now be further partitioned among the 3 volume priority levels (e.g., high, medium and low) for use in connection with each such source site. For example, the 500 BG operations tokens apportioned to site B queues 210 can now be further partitioned among the 3 volume priority level queues 210a-c for use in connection with replicated writes received from site B. For example, the high priority queue 210a of site B can be assigned 50% of the 500 BG operations tokens which is 250 tokens; the medium priority queue 210b of site B can be assigned 30% of the 500 BG operations tokens which is 150 tokens; and the low priority queue 210c of site B can be assigned 20% of the 500 BG operations which is 100 tokens. Additionally, the 250 BG operations tokens apportioned to site C queues 212 can now be further partitioned among the 3 volume priority level queues 212a-c for use in connection with replicated writes received from site C. Thus the DR site A can include 3 volume priority level queues 212a-c for use in connection with replicated writes received from site C. For example, the high priority queue 212a of site C can be assigned 50% of the 250 BG operations tokens which is 125 tokens; the medium priority queue 212b of site C can be assigned 30% of the 250 BG operations tokens which is 75 tokens; and the low priority queue 212c of site C can be assigned 20% of the 250 BG operations which is 50 tokens. Additionally, the 250 BG operations tokens apportioned to site D queues 214 can now be further partitioned among the 3 volume priority levels queues 214a-c for use in connection with replicated writes received from site D. Thus the DR site A can include 3 volume priority level queues 214a-c for use in connection with replicated writes received from site D. For example, the high priority queue 214a of site D can be assigned 50% of the 250 BG operations tokens which is 125 tokens; the medium priority queue 214b of site D can be assigned 30% of the 250 BG operations tokens which is 75 tokens; and the low priority queue 214c of site D can be assigned 20% of the 250 BG operations which is 50 tokens. In this manner in at least one embodiment, the DR site A can include a different set of volume level priority queues (e.g., 210, 212, 214) for each of the multiple source sites (e.g., respectively sites B, C and D).

Each I/O operation, whether an FE I/O or a replicated write I/O, can be normalized. The I/Os can be normalized to a specific size to determine the number of tokens needed to process each I/O. Normalizing the I/O operation can include assigning a cost to the I/O operation based on characteristics of the I/O operation such as I/O size and I/O type. In at least one embodiment, I/Os can be normalized to a size Y, such as 4K, where the cost can be assigned to the I/O based on increments or multiples of 4K. However, the cost may generally not vary linearly with higher I/O sizes since there are processing savings at higher I/O sizes. Although larger I/Os can be expected to have higher latencies, the latency differences between the I/O sizes is generally non-linear. Accordingly, the associated costs can also vary in a non-linear manner with respect to I/O size. Thus in at least one embodiment, the normalized cost per I/O can be non-linear with respect to the I/O payload size due to fixed overhead costs that can be incurred for each single host I/O. As the payload increases, the overhead generally remains the same but can be more evenly considered over a larger payload thus denoting the non-linear aspect. (e.g., 16K payload I/O may not equal 4 times the cost of a 4K payload I/O).

In at least one embodiment using a token-based approach, each normalized I/O operation can be assigned a cost expressed in terms of a number of tokens consumed to perform or service that I/O operation. The cost of an I/O operation can vary with one or more characteristics of the I/O operation such as, for example, the type of I/O operation (e.g., whether it is a read or a write I/O operation) and the size of the I/O operation (e.g., payload size).

When an incoming host I/O (e.g., FE I/O) directed to LUN X 2512 is received at site A 2510, the host I/O can be normalized (as needed) and each such normalized I/O can be assigned a cost as noted above. Subsequently, each normalized I/O directed to LUN X can be placed on one of 3 volume priority level FE I/O queues 230a-c based on the particular volume level priority assigned to LUN X. For example, if LUN X is assigned the high priority level, the I/O directed to LUN X can be placed on the high priority I/O queue 230a. I/Os from each of the 3 volume priority level FE I/O queues 230a-c can be selected for processing where each such I/O can consume a number of tokens of the particular FE I/O queue based on the cost of the selected I/O. For example, if a write I/O is on the high priority FE I/O queue and the write I/O has an associated cost of X tokens, the X tokens are deducted from the current total number of tokens associated with the high priority FE I/O queue. In at least one embodiment, once tokens associated with a particular FE I/O queue are zero, no further I/Os can be selected for processing for the particular FE I/O queue. Consistent with other discussion herein, periodically, the token regulator can apportion and assign additional tokens for FE processing (and its associated volume priority level queues) and for BG operations (and its associated production or source sites and associated volume priority levels) to thereby replenish the tokens available for consumption.

When an incoming replicated write is received at site A 2510, the replicated write can be assigned a cost as noted above. For each source or production site B, C and D in at least one embodiment, a set of volume priority level replicated write queues (respectively 210, 212 and 214) can be maintained. The replicated write received at site A 2510 from a particular one of the source sites can be placed on one of 3 volume priority level replicated write queues associated with the particular source site which sent the replicated write. For example consistent with discussion above, the site A as the DR site can maintain: 3 volume priority level queues 210 for replicated writes received from site B; 3 volume priority level queues 212 for replicated writes received from site C; and 3 volume priority level queues 214 for replicated writes received from site D. For example, an incoming replicated write W1 can be directed to LUN B replica 2518a where the write W1 is received at site A from site B. Assume that LUNs or volumes 2508a and 2518a are designated as medium priority. In this case, W1 can be assigned a cost C1 and placed on the medium priority queue 210b of replicated writes associated with site B (site B queues 210).

Replicated writes from each of the 3 volume priority level replicated write queues 210, 212, 214 for the source sites B, C and D can be selected for processing. Each such write selected from a queue of 210, 212 or 214 can consume a number of tokens apportioned to the particular queue based on the cost of the selected write. For example, if the replicated write W1 is on the medium priority replicated write queue 210b for site B and the write W1 has an associated cost of X tokens, the X tokens are deducted from the current total number of tokens associated with the medium priority replicated write queue 210b of site B. In at least one embodiment, once tokens associated with a particular replicated write queue are zero, no further write can be selected for processing for the particular replicated write queue until, for example, in-progress requests or I/Os complete and give back the previously assigned token, or additional tokens are added or replenished such as can be performed periodically by the token regulator. Consistent with other discussion herein, periodically, the token regulator can apportion and assign additional tokens for FE processing (and its associated volume priority level queues 230) and for BG operations (and its associated production or source sites and associated volume priority levels 220) to thereby replenish the tokens available for consumption.

In an embodiment using a token-based approach, any suitable model or technique can be used to replenish and vary the token supply across the various queues. In at least one embodiment a first model can be used which initially allocates T tokens among the various queues where the supply of T tokens can be replenished to the various queues as I/Os are completed. For example, if an I/O with a cost of K1 tokens is selected for servicing from a first priority queue Q1 with an associated token pool having N1 tokens, the pool of N1 is reduced by the K1 tokens when the I/O is selected for processing. Once servicing or processing of the I/O has completed, the K1 tokens can be returned to the associated token pool for Q1 thereby increasing the current amount of number of tokens in Q1 by K1. In this manner, the initial set of T tokens can be apportioned and recycled by returning them to their respective token pool queues as I/Os are completed. The regulator can periodically reapportion current token amounts of the various queues based on current values of specified percentages when the regulator does its period reapportionment. At various times, the regulator may also add additional tokens to, or reduce/remove tokens from among, one or more of the various queues/pools thus generally accordingly increasing or decreasing the total number of tokens available for apportionment and consumption by the various I/O queues.

With the first model, reapportionment, reassignment or redistribution of all the tokens across the various I/O queues can occur based on a specified periodic frequency. At each such occurrence of the specified periodicity or frequency, current apportionments across all the various I/O queues can be evaluated and modified as may be needed based on such evaluation. Subsequently, the set of aggregated total tokens across the various I/O queues can be redistributed or reapportioned based on the current and possible revised apportionment percentages. It should be noted that an embodiment can also vary or modify the frequency or periodicity of the evaluation, revision (if any) of apportionments, and redistribution or reapportionment of all tokens among the various I/O queues. A selected frequency or periodicity can be determined and varied using any suitable technique. Also, the frequency or periodicity, and generally processing to perform the evaluation, any needed revised reapportionments, and redistribution of tokens, can be performed responsive to any specified trigger event such as, for example, where there is a large change over time in total replication workload, change in replication workload from one or more source sites, change in overall FE I/O workload, and the like.

As a second slightly different model in at least one other embodiment in accordance with the techniques of the present disclosure, a new round of T tokens can be supplied and apportioned periodically by the regulator. For this model, each completed I/O may not return tokens to the pools of the various queues. Rather the regulator can allocate a new round of T tokens periodically and can optionally increase or decrease T the total number of tokens, and thus total number of resources, apportioned and available for consumption of I/Os among the various queues. This second model can be characterized in one aspect as different than the first model above in that the regulator can replenish the queues with a new set of tokens periodically (in the second model) rather than have the completed I/O tokens returned to corresponding queues (as in the first model). The effect and result in the second model is similar to the first model but can differ in how the set of T tokens is replenished/how the token pools of the queues can be replenished. Additionally, with the second model as compared to the first model, there may be a more frequent calibration (e.g., smaller periodicity or frequency) to perform the evaluation, any needed revised reapportionments, and redistribution of tokens.

With whatever model or technique is used in connection with a token-based approach, an embodiment can use a feedback loop to drive the frequency or periodicity of the calibration including evaluation, revising reapportionments and distribution of tokens among the various queues. It should be noted that use of such a feedback loop as well as increasing the frequency or periodicity of the calibration has an associated increased cost.

In one aspect with reference to FIG. 6, the tokens apportioned to each of the different queues 210a-c, 212a-c, 214a-c and 230a-c can be characterized as a pool of tokens allocated and available for use or consumption by I/Os placed on that particular corresponding queue. An I/O on a queue has an associated cost C1 expressed in terms of a number of tokens for processing the I/O. When an I/O is selected for processing and removed from the queue, the I/O consumes the number of tokens denoting the I/O's cost C1 by deducting or subtracting C1 from the current number of available tokens in the particular token pool for the queue.

In at least one embodiment, the token regulator 2520 can facilitate maintaining a target or goal host I/O response time as measured on the data storage system or site A 2510. For example, a maximum host I/O response time can be specified such that the target or goal is to maintain an average I/O response time which is less than the specified maximum host I/O response time. The foregoing measured average I/O response time can be determined with respect to all FE I/Os received at the site A 2510 such as for I/Os directed to LUN X 2512 exposed over the path 2505 to the host 2501.

In at least one embodiment, maintaining or meeting the target host I/O response time can be balanced with performing other processing within the storage system or site A 2510. Thus, the token regulator can periodically evaluate the current apportionment of tokens between FE I/O processing (queues 230), which directly impacts measured host I/O response time, and BG operations (queues 220). In response to such evaluation, the token regulator can modify the apportionment of tokens between the FE I/O processing (queues 230) and BG operations (queues 220), as may be needed and appropriate, to meet any specified target(s) or goals as well as adapt to any dynamically changing conditions in the system. For example, at a first point in time T1, if the measured host I/O response time exceeds the target and is thus too high, the token regulator can allocate or apportion additional tokens to FE I/O processing and thus decrease the apportionment of tokens to BG operations and its queues 220. At another subsequent point in time T2, the measured host I/O response time can be less than the specified target and thus can meet the specified target host I/O response time goal. Also at time T2, there can be a large increase in replicated writes received from one or more of the sites 2502, 2504 and 2506. At time T2, the token regulator can evaluate the current host I/O response time (which meets the specified target) and the large increased workload level with respect to replicated writes received from one or more of the sites 2502, 2504 and 2506. In response at time T2, the token regulator can reapportion the percentage of tokens between FE I/O processing (and its queues 230) and BG operations (and its queues 220) to increase the percentage of tokens apportioned BG operations and decrease the percentage of tokens apportioned to FE I/O processing (e.g., increase the aggregated tokens across queues 220 and decrease aggregated tokens across queues 230). At such periods, the token regulator can replenish or increase the tokens available for consumption of the various queues based on the determined apportionments. For example, at each occurrence of a predetermined time period, the token regulator can distribute a set of T tokens based on current apportionments. Depending on the embodiment, the apportionments at a current time period may have been modified since the immediately prior time period. Depending on the embodiment, one or more of the apportionments for the current time period can be automatically modified or varied based on one or more other conditions or criteria described herein. Such conditions or criteria can include, for example, any one or more of: source site replication write workloads and characteristics; in response to a request from a source site to increase or modify its site level priority or service level for a specified time period; balancing priorities of FE I/Os at site A 2510 (functioning as a production site) and BG operations at site A 2510 (functioning as a DR site); increasing priority of FE I/Os at site A to meet a specified host I/O latency or response time target; increasing priority of BG operations and thus replicated writes at times of increased replicated write workload from one or more source sites; a change in DR site service or priority level as provided to a source site; and other conditions or criteria described herein.

Figure 7:
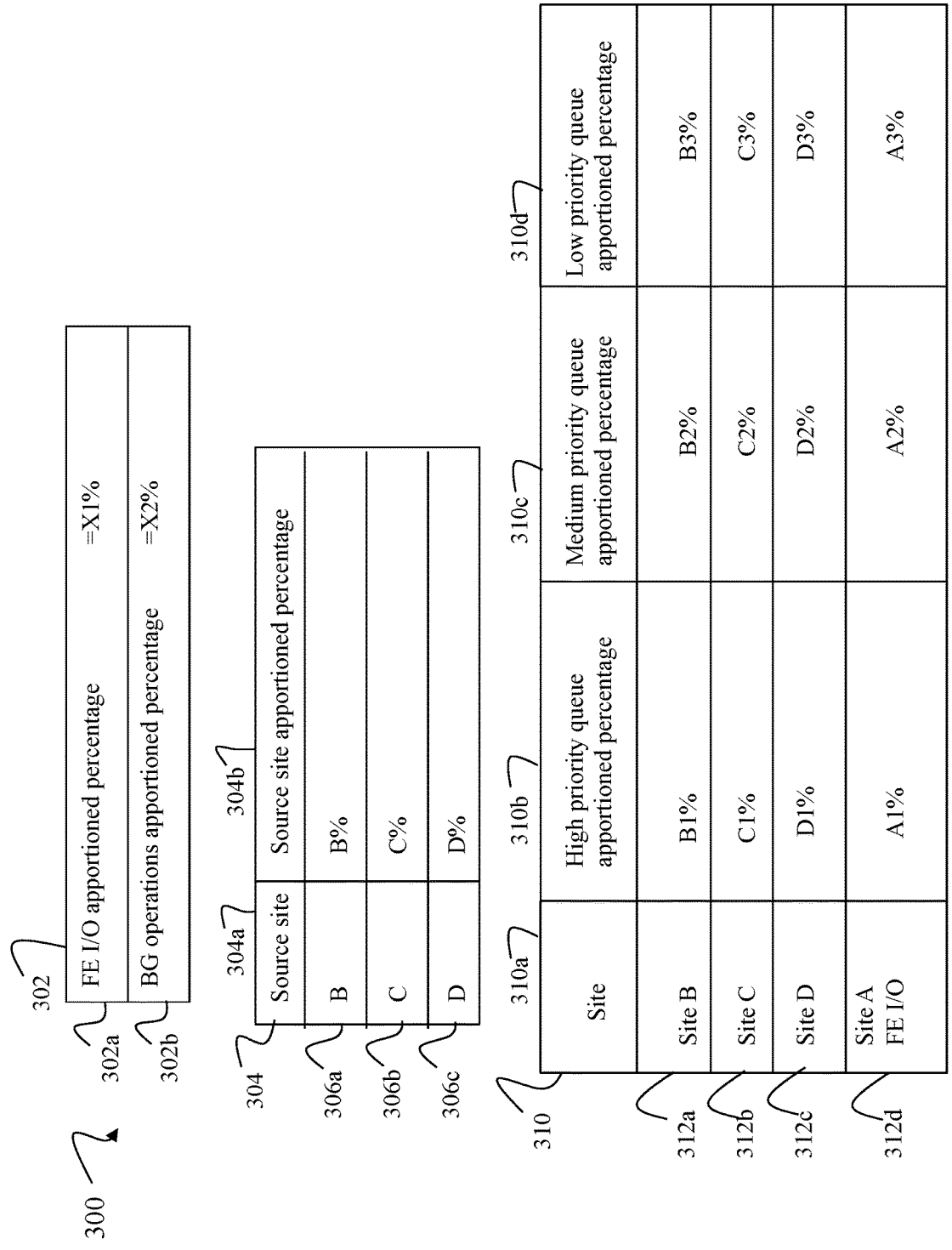
FIG. 7 is an example of tables of apportionment percentages for the various priority queues in at least one embodiment in accordance with the techniques of the present disclosure.

Referring to FIG. 7, shown is an example 300 illustrating various apportionments in terms of percentages that can be used in at least one embodiment in accordance with the techniques of the present disclosure.

The example 300 includes a table 302 indicating current apportionment percentages for FE I/O processing 302a and BG operations 302b. In particular, the table 302 includes line 302a with X1% denoting the FE I/O apportioned percentage; and includes line 302b with X1% denoting the BG operations apportioned percentage. Consistent with discussion herein, the sum of the percentages X1% and X2% can be 100% denoting a first level of apportioning the total number of tokens T between FE I/O processing and BG operations processing. With reference back to FIG. 6, line 302a identifies the percentage of the T tokens apportioned to FE queues 230; and line 302b identifies the percentage of the T tokens apportioned to the priority queues 220 for BG operations.

The example 300 includes a table 304 indicating current apportionment percentages between the replication source sites B, C and D. The table 304 includes a first column 304a identifying the various source sites which can send replicated writes to the DR site A; and a second column 304b denoting the particular percentage of BG operations tokens which are apportioned for use among priority queues of replicated writes received from various source sites. The table 304 denotes a second level of partitioning the tokens allocated to BG operations. The line 306a indicates that for source site B (304a) B % (304b) of the BG tokens are apportioned for use among the multiple priority queues of replicated writes from site B. With reference back to FIG. 6, the line 306a identifies the portion or percentage of the BG tokens apportioned to site B queues 210. The line 306b indicates that for source site C (304a) C % (304b) of the BG tokens are apportioned for use among the multiple priority queues of replicated writes from site C. With reference back to FIG. 6, the line 306b identifies the portion or percentage of the BG tokens apportioned to site C queues 212. The line 306c indicates that for source site D (304a) D % (304b) of the BG tokens are apportioned for use among the multiple priority queues of replicated writes from site D. With reference back to FIG. 6, the line 306c identifies the portion or percentage of the BG tokens apportioned to site d queues 214.

The example 300 includes a table 310 indicating a further partitioning or apportionment of tokens among various sets of 3 priority level queues. The table 310 includes a first column 310a identifying a particular set of priority level queues; a second column 310b identifying a percentage of tokens apportioned to a high priority level queue; a third column 310c identifying a percentage of tokens apportioned to a medium priority level queue; and a fourth column 310d identifying a percentage of tokens apportioned to a low priority level queue.

The line 312a of the table 310 indicates a further apportionment of BG tokens allocated to the B queues 210. In other words, the line 312a is a further partitioning or apportionment of the tokens allocated to site B queues 210 (as determined by line 306a) among the queues 210a-c. Let K1 denote the number of tokens apportioned to the site B queues 210. Then line 312a indicates that B1% (310b) of the K1 tokens are apportioned to the high priority queue 210a; B2% (310c) of the K1 tokens are apportioned to the medium priority queue 210b; and B3% (310d) of the K1 tokens are apportioned to the low priority queue 210c.

The line 312b of the table 310 indicates a further apportionment of BG tokens allocated to the C queues 212. In other words, the line 312b is a further partitioning or apportionment of the tokens allocated to site C queues 212 (as determined by line 306b) among the queues 212a-c. Let K2 denote the number of tokens apportioned to the site C queues 212. Then line 312b indicates that C1% (310b) of the K2 tokens are apportioned to the high priority queue 212a; C2% (310c) of the K2 tokens are apportioned to the medium priority queue 212b; and C3% (310d) of the K2 tokens are apportioned to the low priority queue 212c.

The line 312c of the table 310 indicates a further apportionment of BG tokens allocated to the D queues 214. In other words, the line 312b is a further partitioning or apportionment of the tokens allocated to site D queues 214 (as determined by line 306c) among the queues 214a-c. Let K3 denote the number of tokens apportioned to the site D queues 214. Then line 312c indicates that D1% (310b) of the K3 tokens are apportioned to the high priority queue 214a; D2% (310c) of the K3 tokens are apportioned to the medium priority queue 2124; and D3% (310d) of the K3 tokens are apportioned to the low priority queue 214c.

The line 312d of the table 310 indicates a further apportionment of FE I/O processing tokens allocated to the FE I/O queues 230. In other words, the line 312d is a further partitioning or apportionment of the tokens allocated to FE I/O processing (as denoted by line 302a) among the queues 230a-c. Let K4 denote the number of tokens apportioned to the FE I/O queues 230. Then line 312d indicates that A1% (310b) of the K4 tokens are apportioned to the high priority queue 230a; A2% (310c) of the K4 tokens are apportioned to the medium priority queue 230b; and A3% (310d) of the K4 tokens are apportioned to the low priority queue 230c.

As can be seen from the foregoing in at least one embodiment, the total number of tokens T can be first partitioned between FE I/O processing and BG operations based on table 302. The tokens allocated to FE I/O processing can be further partitioned once among the FE I/O queues 230 based on line 312d of the table 310. The tokens allocated to BG operations can be partitioned two more times. The tokens allocated to BG operations can be first further partitioned among the multiple sources sites in accordance with information in the table 304. Subsequently for BG operations, the tokens allocated to each source site can be further partitioned among the multiple volume level priorities and volume level priority queues in accordance with the information of lines 312a-c of the table 310.

In at least one embodiment, the information in the various tables of 300 can be specified in any suitable manner. For example, an administrator or other suitable user can specify values for the tables 302, 304 and/or 310. In at least one embodiment, the values of the tables 302, 304 and/or 310 can be configurable and can thus be modified by an administrator or other suitable user at various points in time. In at least one embodiment consistent with other discussion herein, one or more conditions or criteria can be specified to provide for automatically modifying any of the values of the tables 302, 304 and/or 310.

In at least one embodiment, the control path or management path can include an option for DR site administrators. The option can allow DR site administrators or other suitable users to apportion tokens, or more generally, available DR site resources, per source site for all source sites, such as site B, C and D of FIG. 5, replicating writes to the DR site, such as site A of FIG. 5. The DR site administrator can, for example, specify any percentage for each source site with the total percentage adding up to 100%. For example, the DR site administrator can specify percentages of tables 302, 304 and/or 310. In at least one embodiment, the sum of the percentages of the lines 302a-b of the table 302 can equal 100%. In at least one embodiment, the sum of the percentages of the lines 306a-c of table 304 can equal 100%. In at least one embodiment, the sum of the percentages B1%, B2% and B3% of lines 312a can equal 100%. In at least one embodiment, the sum of the percentages C1%, C2% and C3% of lines 312b can equal 100%. In at least one embodiment, the sum of the percentages D1%, D2% and D3% of lines 312c can equal 100%.

In at least one embodiment, the various tables 302, 304 and 310 of FIG. 7 can be provided as an input to the token regulator 2520 for use in apportioning and reapportioning the total tokens T being partitioned for a particular time period.

With reference back to FIG. 5, the BG operations tokens can thus be apportioned between replicated writes directed to the replica volumes 2518 of the DR site A based on the per source site which sent the writes and also based on the per replica volume priority specified for each of the replica volumes 2518.

In at least one embodiment, if at a particular time a particular source site is not replicating writes to the DR site A, the particular source site's share of tokens can be apportioned among the remaining source sites which are actively replicating.

The various source site priorities and thus associated apportionments as in table 304 of FIG. 7 can be based, at least in part, on one of more of the following: the workload of the replicated writes of the various sites; and a differentiated class of service that a storage provider administering the DR site A would like to provide to the various source sites. For example, a storage provider can own DR site A and provide DR site services to customers owning source sites A, B and C. The storage provider can, for example, provide multiple classes of DR services such as a first service class or level GOLD denoting a high level of service and a second service class or level BRONZE denoting a lower level of service. A source site, such as site B, subscribing to the GOLD service level can pay a higher service fee than another source site, such as site C, subscribing to the BRONZE service level. The GOLD service level can denote a higher priority and level of service such that replicated writes from source site B are given higher priority and thus a higher apportionment percentage of tokens, than replicated writes from source site C. It should be noted that generally, any suitable number of service levels can be provided and used with the techniques of the present disclosure. In at least one embodiment, each of multiple predefined DR service levels can have an associated relative priority and also an associated apportionment or percentage.

In at least one embodiment, by default, the apportionment among the multiple source sites as denoted by the table 304 of FIG. 7 can be an equal apportionment or percentage of the BG operations tokens. Any changes needed for relative prioritization of one source site over another can be made, for example, by the DR site A administrator.

As described in connection with FIGS. 5, 6 and 7, per volume or replica priority specifications of high, medium and low can be combined with the per source site prioritization in connection with prioritizing replicated writes directed to the replica volumes 2518.

In at least one embodiment, when each of the replica volumes 2518 of the DR site A 2510 is provisioned, an attribute can be defined identifying the particular source site to which the particular replica volume is associated with. Put another way, the replica volume can have an associated attribute identifying the source site which includes the corresponding source volume for the replica volume. In at least one embodiment, the source volume of the source site (identified by the attribute) can be configured for asynchronous replication with its corresponding target or replica volume of the DR site A. To further illustrate with reference to FIG. 5, when provisioning LUN B replica 2518*a* having a corresponding source volume LUN B 2508*a* of site B 2502, LUN B replica volume 2518*a* can have an associated attribute which is a source site ID or identifier identifying site B.

In at least one embodiment, a replicated write I/O, that is directed to a particular replica volume and received at the DR site A 2510 from one of the source sites 2502, 2504, 2506, can be tagged with a source site ID by the DR site A 2510 based on the particular source site ID attribute of the particular replica volume to which the replicated write I/O is directed. In such an embodiment, the DR site A can obtain the source site ID, for example, by querying the source site ID attribute which was set when the particular replica volume was previously provisioned. In such an embodiment, the DR site A 2510 can: receive a replicated write directed to a replica volume; determine the source site ID of the replica volume such as by querying the data path for the value of the source site ID attribute previously specified for the replica volume; determine the volume priority level associated with the replica volume (e.g., either high, medium or low priority); and then place the replicated write in the volume priority level queue associated with the particular source site denoted by the source site ID. As a variation in at least one embodiment, a replicated write I/O received at the DR site A from one of the source sites 2502, 2504, 2506 can be tagged with a source site ID by the sending source site. In this latter scenario in at least one embodiment, the replicated write can itself include a field which includes the source site ID of the source site which sent the replicated write I/O.

In at least one embodiment, the per source site priorities of the table 304 of FIG. 7 may not be expected to change frequently. In the event that there are updates or changes made to the table 304 as well as any others of the tables 300, such changes can be made using the control path or management path. The control path can then provide any updates to the apportionments and thus priorities to the data path. In at least one embodiment, an API (application programming interface) can be called or invoked at node startup time to provide an initial set of source site priorities and thus source site apportionments as in the table 304 to the token regulator 2520. As may be needed, the control path can also provide any updates or changes to source site priorities and corresponding apportionments as can be made by a user or other automation processing described herein.

In at least one embodiment, if a DR site, such as site A of FIG. 5, receives replicated writes from multiple source sites B, C and D, the token regulator 2520 can select particular replicated writes for processing from the various replicated write priority queues 220 of the source sites based on the particular amount of tokens apportioned to each such queue of 220.

In some scenarios, a source site may need a temporary change, such as an increase or decrease, in priority service for a specified amount of time from the DR site. In at least one embodiment, the source site needing the temporary increase or decrease in its site specific priority can issue a request or message to the DR site requesting the temporary increase or decrease in priority. For example with reference to FIG. 5, assume that source site B 2502 needs an increase in its source site level priority for an amount of time H, the site B can send a request to the DR site A 2510 requesting a priority increase for time H. H can be specified in any suitable manner such as, for example, an absolute amount of time, indicating a starting date/time and an ending date/time, and the like. The request can include a value which can indicate a requested amount or level of increased priority. For example, if site B is currently at the BRONZE level of service discussed elsewhere herein, the request can identify an increased predefined level of service requested, such as GOLD, for the time period H. The request can generally request an increase or decrease in priority and the DR site A can accordingly adjust the source site B apportionment of line 306*a*. In some embodiments, the request can identify a relative amount by which to increase or decrease priority based on some predefined scale. For example, an integer value from −10 to +10 can be specified where any negative value can denote a relative decreased in priority and any positive value can denote a relative increase in priority and where 0 can denote a request to restore or return site level priority to some prior value. Thus the range of −10 to +10 can denote a scale where the DR site A can automatically increase or decrease an apportionment percentage by a particular amount relative to the specified integer value.

Generally, the source site can send the foregoing request for a change in source site priority and thus source site apportionment percentages of the table 306 for any suitable reason or trigger event. For example, in at least one embodiment, the source site can receive an RPO (recovery point objective) alert indicating that a specified target RPO for the source site, or one or more source volumes thereof, is not being met with respect to configured replication to the DR site A. In other words, an actual or observed RPO such as with respect to replicated writes sent to the DR site A can be greater than a target RPO thereby triggering an RPO alert on the source site. In response to the RPO alert, the source site can send a request as noted above to the DR site requesting an increase in its source site level priority for processing replicated writes which the source site sends to the DR site. As another example, the source site can request a higher level or class of DR services in response to a requirement change such as a reduction in the target RPO for the source site or one or more of its source volumes replicated to the DR site. In this latter case, the request can be for a specified time period or can be a more permanent change. For example, in this latter case, the source site can issue a request to the DR site to increase its service or priority level until further notice such that the increased priority or service level is now the new default for the source site. Such changes made at the source site can be policy changes which are automated and/or manual.

With reference back to FIG. 5, the site A 2510 as discussed above can be used in scenarios a both a DR site, such as for sites 2502, 2504 and 2506, and a production or source site. In this manner, there can be both replicated writes as well as FE host I/Os received at site A. At various points in time and to accommodate other possible scenarios, site A may only be used as a DR site for example where there is no volume such as LUN X 2512 exposed over an active path 2505 to a host. In other words, it may be that no host or other external client can issue I/Os to site A for servicing through FE ports of site A. Thus the path 2505 can be passive and only replication links or paths 2503*a-c* are actively used for sending replicated writes to site A. In this case the predominant or only I/O traffic on the site A is replicated writes. To accommodate the various possible changing use case scenarios of site A, it can be desirable to balance and dynamically modify the priority of replica volume writes from source sites with that of FE host I/Os. For example, at a first point in time T11, site A can only be used as a DR site such that LUN X 2512 is not exposed for I/Os over any active paths. At time T11, the FE I/O processing and BG operations priorities can be adjusted, manually and/or automatically, to allocate most resources for use with BG operations by increasing BG operations priority and thus increasing the relative apportionment percentage of BG operations as in the line 302*b* of the table 302 of FIG. 7 and also decreasing the apportionment percentage of FE I/O processing as in line 302*a* of the table 302 of FIG. 7. At a subsequent point in time T12, LUN X 2512 can be provisioned and exposed for I/Os over active path 2505. At time T12, the apportionment percentages and thus priorities of FE I/O processing and BG operations can be adjusted so that FE I/O processing priority is increased (e.g., apportionment of line 302*a* increased) and BG operations priority is decreased (e.g., apportion of line 302*b* is decreased). At yet a third point in time T13 subsequent to T12, site B can undergo maintenance, experience a failure or other even which causes failover to DR site A where LUN B replica 2518*a* is used to service I/Os over path 2505 from the host 2501 since site B 2502 and source LUN B 2508*a* are unavailable to the host 2501. At the time T13, the apportionment percentages and thus priorities of FE I/O processing and BG operations can be further adjusted so that FE I/O processing priority is again further increased (e.g., apportionment of line 302*a* increased) and BG operations priority is again further decreased (e.g., apportion of line 302*b* is decreased). The foregoing increases in FE I/O processing priority and apportionments can occur to meet the host I/O latency or response time requirements for volumes LUN X and LUNB replica 2518*a* now exposed at time T13 over the active path 2505. Thus, the control or management path can include appropriate controls which allows for adjustment of priorities and associated apportionments of generally any of the tables 300 of FIG. 7. Such adjustments can be performed automatically, such as by a component in response to detecting a particular condition or event, as well as manually such as by a DR site administrator, to prioritize the host writes appropriately as compared to the replication writes. In some cases, it can be necessary to prioritize the replication volume writes higher than FE I/O processing, and in other scenarios the FE I/O processing priority can be increased. In at least one embodiment, an adjustment can be made to reduce priority of FE I/O processing and increase BG operations priority in response to detecting that FE I/O processing workload is below a first threshold level and/or in response to detecting that the replicated writes workload (e.g., BG processing workload) is above a second threshold. In at least one embodiment, an adjustment can be made to increase priority of FE I/O processing and decrease BG operations priority in response to detecting that FE I/O processing workload is above threshold level and/or in response to detecting that the replicated writes workload (e.g., BG processing workload) is below a specified threshold.

In some scenarios, an adjustment can be made to decrease priority of FE I/O processing and increase BG operations priority such as when it is known that the FE host I/Os are lower priority FE host I/Os from a particular host or application such as a backup application executing on the host. An adjustment can also be made to decrease FE I/O processing priority and increase BG operations priority such as if one or more volume or source site RPOs are not being met. In the foregoing scenarios, a decision can be made to shift priority and thus increase resources used in connection with BG operations and replicated write I/Os. Consistent with other discussion herein, such adjustments and detection of conditions triggering such adjustments can be automatic and/or manual. In at least one embodiment, changing priorities and thus apportionments can be done at multiple apportionment levels resulting in changes to more than one of the tables of FIG. 7. For example, FE I/O percentage 302*a* can be decreased and BG operations percentage 302*b* can be increased. Additionally, the FE I/O queue token pools having associated apportionments denoted by line 312*d* can also be modified such that shifting of FE I/O tokens can result in decreasing the tokens A3% of the low priority FE I/O queue 230*c* and decreasing tokens A2% of the medium priority FE I/O queue 230*b* but also increasing the percentage of tokens A1% of the high priority FE I/O queue 230*a*. In this manner, the tokens can be shifted from the low and medium FE I/O queues 230*b-c* into the BG operations token pools to thereby increase the tokens or resources for BG operations. However, the apportionments of line 312*d* can be adjusted such that the high priority FE host I/Os are not adversely impacted or minimally impacted. In at least one embodiment, there can be scenarios where the storage administrator can override priorities and apportionments set automatically by the DR site whereby the storage administrator can manually modify any one or more of the values of the tables of FIG. 7.

What will now be described are flowcharts of processing steps that can be performed in at least one embodiment in accordance with the techniques of the present disclosure. The flowcharts summarized processing described above.

Figure 8:
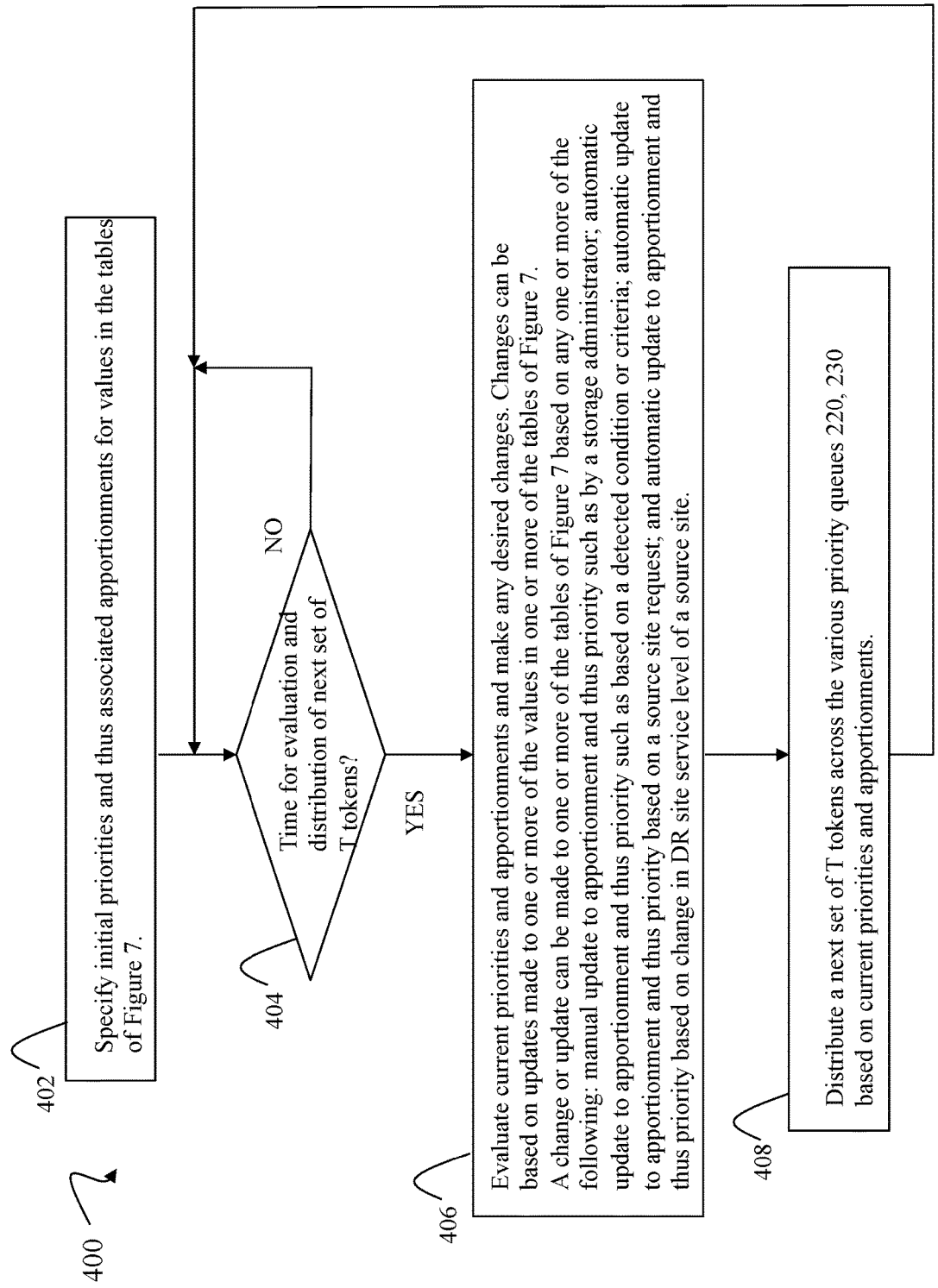
FIGS. 8 and 9 are flowcharts of processing steps that can be performed in at least one embodiment in accordance with the techniques of the present disclosure.

Referring to FIG. 8, shown is a first flowchart 400 of processing steps that can be performed in at least one embodiment in accordance with the techniques of the present disclosure.

At the step 402, processing can be performed to specify initial priorities and associated apportionments for values in the tables of FIG. 7. From the step 402 control proceeds to the step 404.

At the step 404, a determination is made as to whether it is time to evaluate and distribution a next set of T tokens. As discussed elsewhere herein, periodically such as at predefined time intervals, processing can be performed to evaluate the current apportionments and priorities in the tables of FIG. 7, make any needed changes to such apportionments, and then distribute a next set of T tokens based on the apportionments of the tables of FIG. 7. Thus the step 404 can determine whether the current time denotes an occurrence of such a time period or interval. If the step 404 evaluates to no, control remains at the step 404. If the step 404 evaluates to yes, control proceeds to the step 406.

At the step 406, processing can be performed to evaluate current priorities and apportionments specified in the tables of FIG. 7 and make any desired changes. Changes can be based on updates made to one or more of the values in one or more of the tables of FIG. 7. A change or update can be made to one or more of the tables of FIG. 7 based on any one or more of the following: manual update to apportionment and thus priority such as by a storage administrator; automatic update to apportionment and thus priority such as based on a detected condition or criteria; automatic update to apportionment and thus priority based on a source site request; and automatic update to apportionment and thus priority based on change in DR site service level of a source site. From the step 406, control proceeds to the step 408.

At the step 408, processing is performed to distribute a next set of T tokens across the various priority queues 220, 230 based on current priorities and apportionments of the tables of FIG. 7. Additionally, the amount of tokens T distributed can be increased or decreased at various points in time as may be needed and determined in accordance with the evaluation at the step 404. From the step 408, control returns to the step 404.

Figure 9:
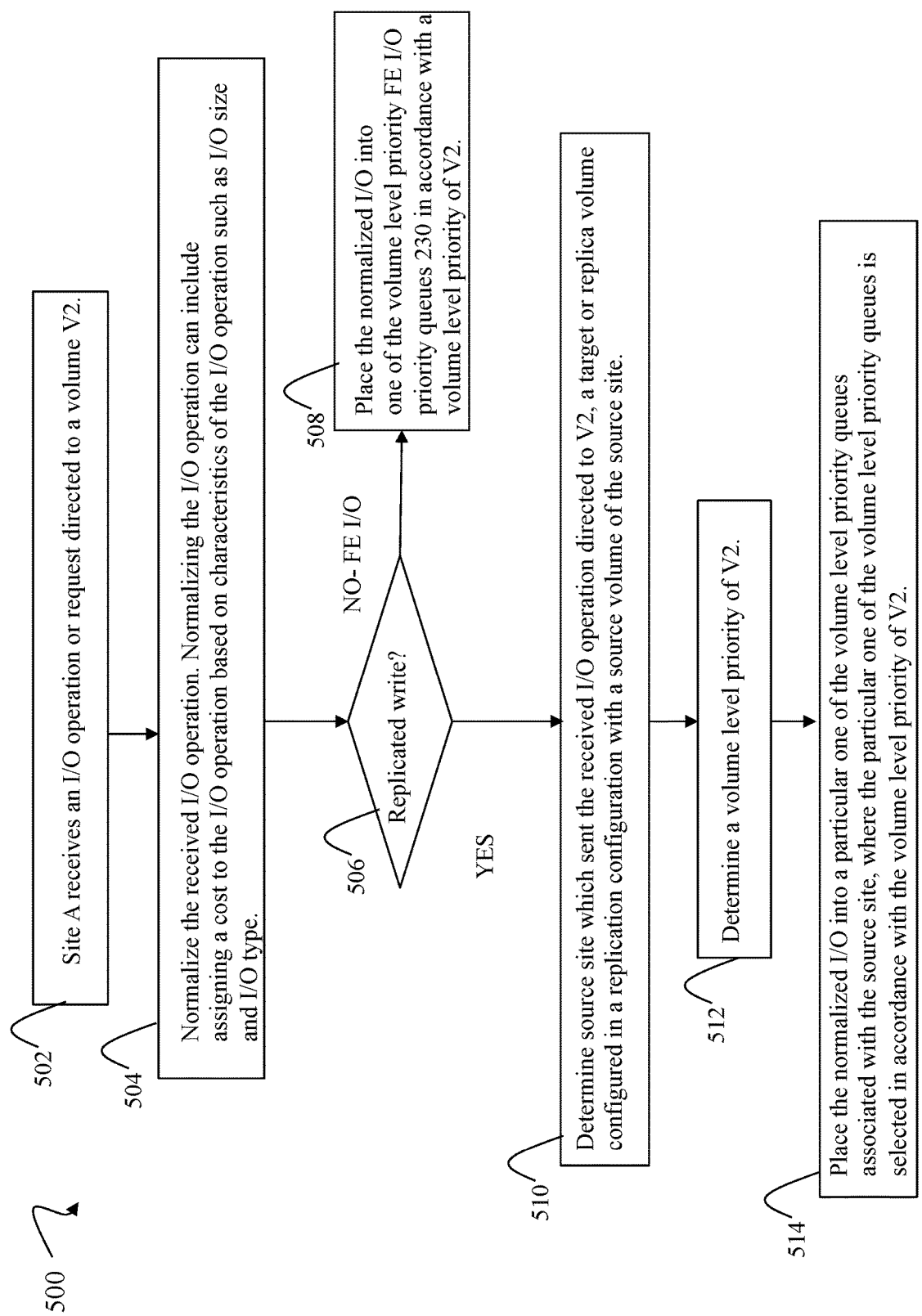

Referring to FIG. 9, shown is a second flowchart 500 of processing steps that can be performed in at least one embodiment in accordance with the techniques of the present disclosure.

At the step 502, site A receives an I/O operation or request directed to a volume V2. The I/O operation can be a FE I/O, such as received from a host, or a replicated write I/O, such as received from one of the source sites such as one of sites B, C and D. The volume V2 can be configured in a replication configuration, such as an asynchronous replication configuration, with another source volume V1 of one of the source sites. From the step 502, control proceeds to the step 504.

At the step 504, the received I/O operation can be normalized. Normalizing the I/O operation can include assigning a cost to the I/O operation based on characteristics of the I/O operation such as, for example, I/O size and I/O type. The I/O size can denote the size of the payload. Consistent with other discussion herein in at least one embodiment, the costs of I/O operations can be non-linear or scale in a non-linear manner with respect to a I/O sizes. From the step 504, control proceeds to the step 506.

At the step 506, a determination is made as to whether the received I/O (received in the step 502) is a replicated write from one of the source sites configured for replication with site A as a DR site. If the step 506 evaluates to no, it is determined that the received I/O is a FE I/O and control proceeds to the step 508.

At the step 508, processing can be performed to place the normalized I/O into one of the volume level priority FE I/O priority queues 230 in accordance with a volume level priority of V2.

If the step 506 evaluates to yes thereby indicating that the received I/O is a replicated write, control proceeds to the step 510. At the step 510, processing is performed to determine the source site which sent the received I/O operation directed to V2, a target or replica volume configured in a replication configuration with a corresponding source volume V1 of the source site. From the step 510, control proceeds to the step 512.

At the step 512, processing can be performed to determine a volume level priority for the replica volume V2. In at least one embodiment, the configured replication volume pair including the source volume V1 and its corresponding target or replica volume V2 on site A, can both be configured to have the same priority level. As a variation, an embodiment can alternatively allow for the priority of the source volume V1 and its corresponding target or replica volume V2 to have independently configured volumes priority levels where the source volume V1 can have a first volume level priority that is different from a second volume level priority specified for the corresponding target or replica volume V2 on site A. From the step 512, control proceeds to the step 514.

At the step 514, processing can be performed to place the normalized I/O into a particular one of the volume level priority queues associated with the source site, where the particular one of the volume level priority queues is selected in accordance with the volume level priority of V2.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:
1. A computer-implemented method comprising:
configuring a plurality of source sites in a replication configuration with a single target site, wherein each of the plurality of source sites includes a source storage object configured for replication to a corresponding target storage object of the single target site, wherein the replication configuration provides for automatically replicating writes, that are directed to source storage objects of the source sites, to corresponding target storage objects of the single target site;
receiving, at a first of the plurality of source sites from a host, a first write I/O that writes first content to a first target location of a first source storage object of the first source site;
applying the first write I/O to the first target location of the first source storage object of the first source site;
sending a first replicated write corresponding to the first write I/O from the first source site to the single target site, wherein the first replicated write writes the first content to the first target location of a first target storage object of the single target site;
prioritizing the first replicated write, based at least in part, on a site-level priority associated with the first source site;

placing the first replicated write in a first queue of a first plurality of queues based, at least in part, on the site level priority associated with the first source site;

selecting the first replicated write from said first queue; and servicing the first replicated write.

2. The computer implemented method of claim 1, wherein said prioritizing the first replicated write further includes prioritizing the first replicated write based, at least in part, on a first storage resource level priority specified for the first target storage object of the single target site.

3. The computer-implemented method of claim 2, wherein the single target site includes a plurality of sets of priority queues, wherein each set of the plurality of sets of priority queues includes two or more priority queues for replicated writes and where said each set is associated with a corresponding one of the plurality of source sites, and wherein said first plurality of queues is included in a first set of the plurality of sets and where the first set is associated with the first source site.

4. The computer-implemented method of claim 3, wherein the first plurality of queues includes a single queue for each predefined storage resource level priority included in a plurality of predefined storage resource priority levels.

5. The computer-implemented method of claim 4, further comprising:

receiving a first table of percentages denoting apportionments of tokens between front-end (FE) I/O processing at the single target site and background operation I/O processing at the single target site, wherein the background operation I/O processing includes processing of replicated writes received from the plurality of source sites.

6. The computer-implemented method of claim 5, further comprising:

receiving a second table of percentages denoting apportionments of tokens among the plurality of source sites.

7. The computer-implemented method of claim 6, further comprising:

receiving a third table of percentages denoting apportionments of tokens among the plurality of sets of priority queues of replicated writes from the plurality of source sites, wherein the third table includes a plurality of storage resource level percentages for each of the plurality of source sites, wherein the third table further includes an additional set of percentages denoting apportionments of tokens among first FE I/O priority queues of external I/Os received at the single target set from one or more hosts, wherein said external I/Os are received at the single target site and are directed to one or more production storage objects exposed over one or more active paths from the single target site to the one or more hosts.

8. The computer-implemented method of claim 7, further comprising:

apportioning a number of tokens T between the FE I/O processing of the single target site and the background I/O processing at the single target site in accordance with the first table of percentages, wherein said apportioning the number of tokens T results in allocating T1 of the T tokens to FE I/O processing and T2 of the T tokens to background I/O processing.

9. The computer-implemented method of claim 8, further comprising:

apportioning the T1 tokens allocated to FE I/O processing among the first FE I/O priority queues in accordance with the additional set of percentages;

apportioning the T2 tokens allocated to background I/O processing among the plurality of source sites in accordance with the second table of percentages, wherein each of the plurality of source sites is allocated a corresponding one of a plurality of source site portions of the T2 tokens of background I/O processing; and apportioning each of the plurality of source site portions of the T2 tokens among a corresponding one of the plurality of sets of priority queues of replicated writes associated with said each source site in accordance with the plurality of storage resource level percentages for said each source site.

10. The computer-implemented method of claim 6, further comprising:

receiving a request from the first source site to increase the site level priority of the first source site, wherein the first source site has a first site level priority prior to receiving the request; and responsive to receiving the request, increasing the site level priority of the first source site from the first site level priority to a second site level priority that denotes a higher level priority and level of service than the first site level priority.

11. The computer-implemented method of claim 10, wherein the second table includes a first source site level percentage denoting an apportionment of tokens for the first source site, and wherein said increasing the site level priority of the first source site includes increasing the first source site level percentage and accordingly decreasing at least one other source site level percentage of the second table.

12. The computer-implemented method of claim 10, wherein the request includes a specified time period and wherein the increase in site level priority of the first source site from the first site level priority to the second site level priority is effective for the specified time period.

13. The computer-implemented method of claim 12, wherein subsequent to the specified time period expiring or completing, the site level priority of the first source site is restored to the first site level priority.

14. The computer-implemented method of claim 10, wherein the request is sent by the first source site responsive to the first source site receiving an RPO (recovery point objective) alert indicating non-compliance with a specified target RPO for at least one source storage object of the first source site configured for replication to at least one corresponding target storage object of the single target site.

15. The computer-implemented method of claim 1, wherein the first plurality of queues includes replicated writes received from only the first source site, wherein each queue of the first plurality of queues is associated with a corresponding one of a plurality of predefined storage resource level priorities, wherein the first source storage object has an associated first attribute identifying a first of the predefined storage resource level priorities assigned to the first source storage object, wherein the method includes:

selecting to place the first replicated write in the first queue based, at least in part, on the first attribute of the first source storage object identifying the first predefined storage resource level priority, wherein the first queue includes replicated writes which are sent from the first source site to the single target site and which are directed to target storage objects of the single target site assigned the first predefined storage resource level priority.

16. The computer-implemented method of claim 15, wherein the first plurality of queues for replicated writes of the first source site is associated with a first plurality of token pools, where each of the first plurality of queues is associated with a corresponding one of the first plurality of token pools, wherein each of the first plurality of token pools includes a number of tokens determined in accordance with the site level priority of the first source site and in accordance with one of the plurality of predefined storage resource level priorities corresponding to said each token pool.

17. The computer-implemented method of claim 16, wherein the first replicated write has a first cost expressed as a first number of tokens, wherein the first queue is associated with a first of the plurality of token pools having a first amount of tokens, and wherein said servicing the first replicated write includes deducting the first number of tokens from the first amount of tokens of the first token pool.

18. A system comprising:
one or more processors; and
a memory comprising code stored thereon that, when executed, performs a method comprising:
configuring a plurality of source sites in a replication configuration with a single target site, wherein each of the plurality of source sites includes a source storage object configured for replication to a corresponding target storage object of the single target site, wherein the replication configuration provides for automatically replicating writes, that are directed to source storage objects of the source sites, to corresponding target storage objects of the single target site;
receiving, at a first of the plurality of source sites from a host, a first write I/O that writes first content to a first target location of a first source storage object of the first source site;
applying the first write I/O to the first target location of the first source storage object of the first source site;
sending a first replicated write corresponding to the first write I/O from the first source site to the single target site, wherein the first replicated write writes the first content to the first target location of a first target storage object of the single target site;
prioritizing the first replicated write, based at least in part, on a site-level priority associated with the first source site;
placing the first replicated write in a first queue of a first plurality of queues based, at least in part, on the site level priority associated with the first source site;
selecting the first replicated write from said first queue; and
servicing the first replicated write.

19. A non-transitory computer-readable memory comprising code stored thereon that, when executed, performs a method comprising:
configuring a plurality of source sites in a replication configuration with a single target site, wherein each of the plurality of source sites includes a source storage object configured for replication to a corresponding target storage object of the single target site, wherein the replication configuration provides for automatically replicating writes, that are directed to source storage objects of the source sites, to corresponding target storage objects of the single target site;
receiving, at a first of the plurality of source sites from a host, a first write I/O that writes first content to a first target location of a first source storage object of the first source site;
applying the first write I/O to the first target location of the first source storage object of the first source site;
sending a first replicated write corresponding to the first write I/O from the first source site to the single target site, wherein the first replicated write writes the first content to the first target location of a first target storage object of the single target site;
prioritizing the first replicated write, based at least in part, on a site-level priority associated with the first source site;
placing the first replicated write in a first queue of a first plurality of queues based, at least in part, on the site level priority associated with the first source site;
selecting the first replicated write from said first queue; and
servicing the first replicated write.

* * * * *